US012679102B2

(12) United States Patent
Onuma et al.

(10) Patent No.: US 12,679,102 B2
(45) Date of Patent: Jul. 14, 2026

(54) LIQUID EJECTING APPARATUS AND LIQUID EJECTING SYSTEM

(71) Applicant: SEIKO EPSON CORPORATION, Tokyo (JP)

(72) Inventors: Yohei Onuma, Shiojiri (JP); Shoma Kudo, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 223 days.

(21) Appl. No.: 18/737,410

(22) Filed: Jun. 7, 2024

(65) Prior Publication Data

US 2024/0408879 A1 Dec. 12, 2024

(30) Foreign Application Priority Data

Jun. 9, 2023 (JP) ................................ 2023-095366

(51) Int. Cl.
*B41J 29/13* (2006.01)
*B41J 2/175* (2006.01)

(52) U.S. Cl.
CPC ....... *B41J 2/17523* (2013.01); *B41J 2/17553* (2013.01); *B41J 2/17596* (2013.01); *B41J 29/13* (2013.01)

(58) Field of Classification Search
CPC .... B41J 2/175; B41J 2/17503; B41J 2/17506; B41J 2/17509; B41J 2/1752; B41J 2/17523; B41J 2/17553; B41J 2/17596; B41J 29/17509; B41J 29/13
See application file for complete search history.

(56) References Cited

U.S. PATENT DOCUMENTS 4,831,389 A * 5/1989 Chan .................... B41J 2/17513 347/86
5,485,187 A * 1/1996 Okamura ................ B41J 2/175 347/85
6,409,322 B1 * 6/2002 Ishitsu ................ B41J 2/17523 347/85
9,150,011 B1 * 10/2015 Tomoguchi .......... B41J 2/17566
10,259,229 B2 4/2019 Kimura et al.
2016/0207319 A1 * 7/2016 Shirono ............... B41J 2/17553
2017/0157938 A1 * 6/2017 Kobayashi ............... B41J 2/175
2018/0215164 A1 * 8/2018 Hayashi ............... B41J 2/17546

FOREIGN PATENT DOCUMENTS

JP 2018-069717 A 5/2018

* cited by examiner

*Primary Examiner* — Anh T Vo
(74) *Attorney, Agent, or Firm* — Oliff PLC

(57) ABSTRACT

A liquid ejecting apparatus includes an ejection head, a plurality of liquid containers, a casing, and a fixing portion that fixes the plurality of liquid containers to the casing. The liquid container has a liquid storage portion, a liquid supply portion, and a liquid discharge portion. The liquid supply portion is directly or indirectly coupled to one end portion of a supply passage supplying liquid to the ejection head. The liquid discharge portion discharges liquid stored in the liquid storage portion to the outside. The liquid ejecting apparatus includes a separating mechanism that, in a state where fixing of the liquid container to the casing by the fixing portion is released, separates the liquid container individually from the casing in a first direction which is a direction of separating the liquid supply portion from the one end portion of the supply passage.

9 Claims, 17 Drawing Sheets

LIQUID EJECTING APPARATUS AND LIQUID EJECTING SYSTEM

The present application is based on, and claims priority from JP Application Serial Number 2023-095366, filed Jun. 9, 2023, the disclosure of which is hereby incorporated by reference herein in its entirety.

BACKGROUND

1. Technical Field

The present disclosure relates to a liquid ejecting apparatus equipped with an ejection head that ejects liquid and a liquid ejecting system.

2. Related Art

For example, as an example of a liquid ejecting apparatus, JP-A-2018-69717 discloses an ink jet printer including an ejection head that ejects liquid such as ink toward a medium such as paper.

This liquid ejecting apparatus includes an ink tank as an example of a liquid container storing liquid supplied to the ejection head.

Moreover, a cartridge-type liquid ejecting apparatus to which ink cartridges can be mounted detachably is known. In the case of the cartridge type, when the ink runs out, the whole ink cartridge is replaced. On the other hand, a liquid container such as an ink tank is basically assembled while being fixed to a casing with a fixing portion such as screws. When ink runs out, the user couples an ink bottle to an ink pouring passage portion of the liquid container to refill the liquid container with liquid from the ink bottle.

Incidentally, when disposing of a liquid ejecting apparatus, even if liquid such as ink remains in the ink cartridge, if the apparatus is a cartridge type, the apparatus can be disposed of after removing the ink cartridge. On the other hand, in the case of a liquid container such as an ink tank, the liquid ejecting apparatus is often disposed of with the liquid container fixed to the casing. However, when liquid such as ink remains in the liquid container at the time of disposal of the liquid ejecting apparatus, if the liquid ejecting apparatus is tilted during the disposal, the liquid may spill from the liquid container due to a loose or missing cap.

For this reason, when disposing of a tank-type liquid ejecting apparatus, the user may dispose of the liquid ejecting apparatus after collecting the liquid in the liquid container.

However, in a liquid ejecting apparatus including a liquid-refillable liquid container, the liquid container is difficult to remove from the casing. Specifically, the liquid container is fixed to a sheet metal or the like forming the casing of the liquid ejecting apparatus by a fixing portion such as screws. With this structure, the liquid container is fixed firmly so as not to be affected by external impact during transport, for example. Hence, the liquid ejecting apparatus is disposed of with the liquid container assembled thereto. As described above, the liquid-refillable liquid container does not consider a configuration of discharging or collecting residual liquid in the liquid container when disposing of the liquid ejecting apparatus.

For example, in order to discharge or collect the liquid in the liquid container, it is necessary to disconnect the coupling between a liquid supply portion of the liquid container and a supply passage such as a tube, and remove the liquid from the liquid supply portion or from a filler port for liquid refill. Since the liquid supply portion and the filler port do not have a structure considering removal of the liquid, the liquid may spill during the removal or liquid such as ink may attach to the fingers and stain them. Specifically, the liquid supply portion that supplies liquid such as ink from the liquid container to an ejection head has a structure in which a tube is press-fitted and is not easily removable or insertable. Hence, when the tube is removed from the liquid supply portion, the ink in the liquid container may spill to the outside from the supply port of the liquid supply portion. Therefore, there is a need for a liquid ejecting apparatus that enables easy discharge and collection of residual liquid in a liquid container when disposing of the liquid ejecting apparatus.

SUMMARY

A liquid ejecting apparatus for solving the above problem includes: an ejection head ejecting liquid; a plurality of liquid containers configured to store liquid supplied to the ejection head; a casing accommodating the ejection head and the plurality of liquid containers; and a fixing portion fixing the plurality of liquid containers to the casing, in which each of the plurality of liquid containers includes a liquid storage portion configured to store liquid, a liquid supply portion that is a part to which one end portion of a supply passage supplying liquid to the ejection head is directly or indirectly coupled, and a liquid discharge portion discharging liquid stored in the liquid storage portion to the outside; and the liquid ejecting apparatus further comprises a separating mechanism configured to, in a state where fixing by the fixing portion of the liquid container to the casing is released, separate the liquid container individually from the casing in a first direction which is a direction of separating the liquid supply portion from the one end portion of the supply passage.

A liquid ejecting apparatus for solving the above problem includes: an ejection head ejecting liquid; a plurality of liquid containers configured to store liquid supplied to the ejection head; a casing accommodating the ejection head and the plurality of liquid containers; and a fixing portion fixing the plurality of liquid containers to the casing, in which each of the plurality of liquid containers includes a liquid storage portion configured to store liquid, a liquid supply portion that is a part to which one end portion of a supply passage supplying liquid to the ejection head is directly or indirectly coupled, and a liquid discharge portion discharging liquid stored in the liquid storage portion to the outside; and the liquid ejecting apparatus further comprises a separating mechanism configured to, in a state where fixing by the fixing portion is released, separate the plurality of liquid containers collectively from the casing in a first direction which is a direction of separating the liquid supply portion from the one end portion of the supply passage.

A liquid ejecting system for solving the above problem includes: the above liquid ejecting apparatus a liquid collection container, in which the liquid collection container includes a collection coupling portion configured to be coupled to the liquid discharge portion of the liquid container, a collection container portion storing liquid collected through coupling between the liquid discharge portion and the collection coupling portion from the liquid container, and an atmospheric connection portion connecting the inside of the collection container portion to the atmosphere; and the liquid discharge portion of at least one liquid container separated from the one end portion of the supply passage among the plurality of liquid containers is coupled to the collection coupling portion, whereby the liquid in the liquid container is collected into the liquid collection container by hydraulic head pressure.

DESCRIPTION OF EMBODIMENTS

First Embodiment

Hereinafter, a first embodiment of a liquid ejecting apparatus including a liquid container will be described with reference to the drawings. Note that the liquid ejecting apparatus of the present embodiment is a multifunction peripheral, for example, and ejects liquid such as ink onto a medium such as paper to print (record) characters, images, and the like on the medium.

Figure 1:
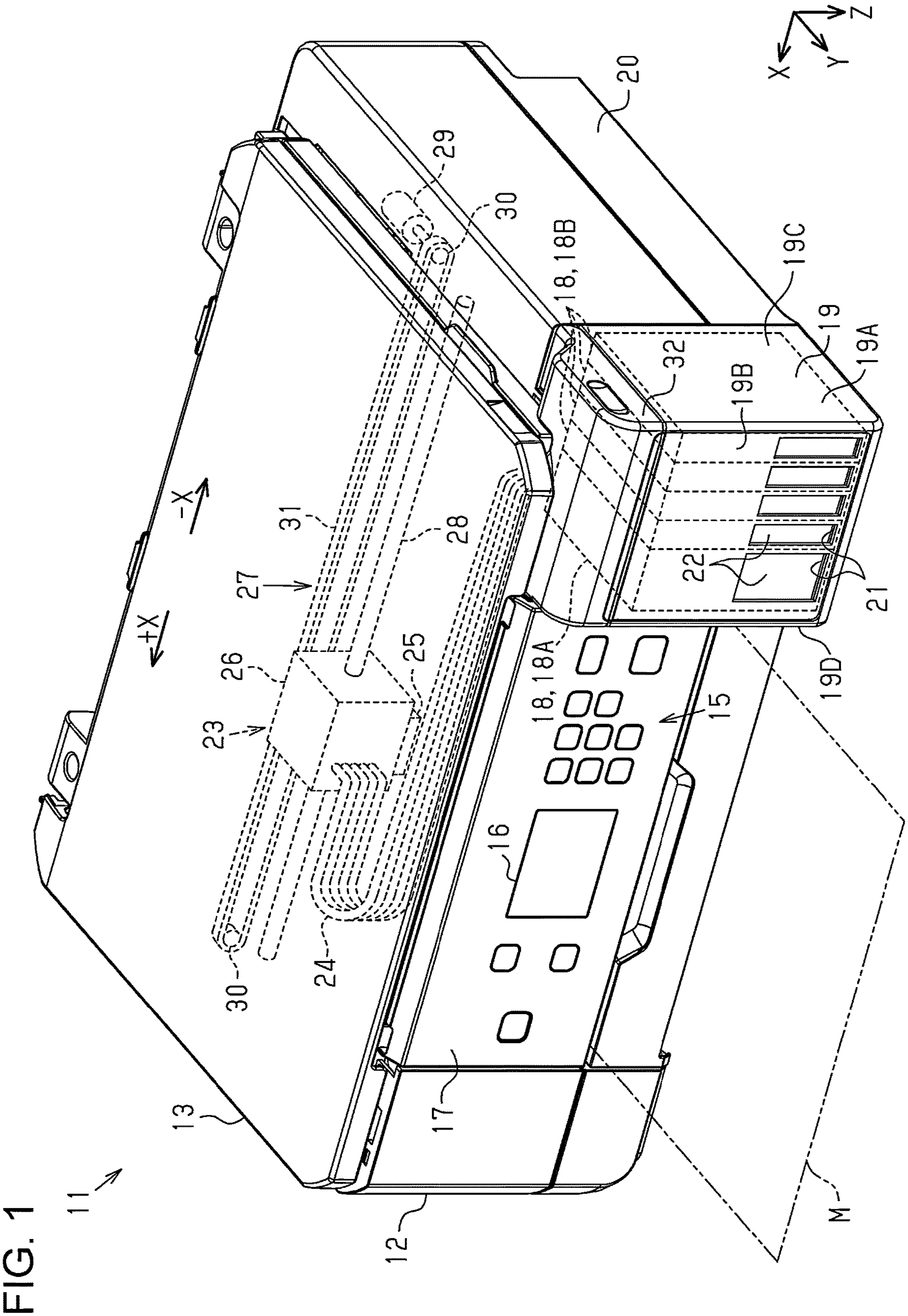
FIG. 1 is a perspective view illustrating a liquid ejecting apparatus of a first embodiment.

As illustrated in FIG. 1, a liquid ejecting apparatus 11 includes an apparatus main body 12 and an image reading apparatus 13 in an upper part of the apparatus main body 12, and has a substantial rectangular parallelepiped shape as a whole.

FIG. 1 illustrates the liquid ejecting apparatus 11 placed on a horizontal plane, where the direction of gravity is a vertical direction Z and two directions along the horizontal plane are a width direction X and a transport direction Y. That is, the width direction X, the transport direction Y, and the vertical direction Z intersect (may be orthogonal to) one another. The transport direction Y is a direction in which a medium M is transported at a printing position facing the ejection head 25 described later. Moreover, in the transport direction Y, one end side may be referred to as the front side and the other end side opposite to the one end side may be referred to as the rear side. In the width direction X as viewed from the front side, one end side may be referred to as the right side and the other end side may be referred to as the left side.

Configuration of Liquid Ejecting Apparatus 11

As illustrated in FIG. 1, an operation panel 17 is provided on a front surface of the liquid ejecting apparatus 11. The operation panel 17 has an operation portion 15 including buttons or the like for performing various operations and a display portion 16 displaying various types of information such as menus and operating statuses. Furthermore, a storage portion 19 is provided on the right side of the operation panel 17. At least one liquid container 18 is accommodated in the storage portion 19. A plurality of (five in the present embodiment) liquid containers 18 are accommodated in the storage portion 19 of the present embodiment. The storage portion 19 forms a part of a casing 20. In other words, the casing 20 includes the storage portion 19 capable of accommodating a plurality of liquid containers 18. The liquid container 18 is an ink-tank type, for example.

The storage portion 19 includes a substantially box-shaped storage portion main body 19A open toward the upper side and a cover 32. The cover 32 covers an upper opening of the storage portion main body 19A in an openable and closable state. The storage portion main body 19A includes a door body 19B located on the front side and having at least one (five in the present embodiment) window portion 21 for viewing, and a pair of left and right side plates 19C and 19D. The window portion 21 is provided for each liquid container 18. A viewing surface 22 on a front surface of the liquid container 18 is exposed in the window portion 21. The user views the remaining amount of liquid in the liquid container 18 through the viewing surface 22 exposed in the window portion 21. In the present embodiment, the door body 19B which is a plate-shaped part having the window portion 21 and forming a front plate portion of the storage portion main body 19A is attachable and detachable to and from the storage portion main body 19A.

As illustrated in FIG. 1, the plurality of liquid containers 18 accommodated in the storage portion 19 includes a first liquid container 18A and a second liquid container 18B capable of storing different amounts of ink, and is arranged side by side in the width direction X. The example illustrated in FIG. 1 includes one first liquid container 18A and four second liquid containers 18B. The one first liquid container 18A has a larger capacity than the second liquid container 18B and stores black ink, for example. The four second liquid containers 18B store different colored inks, for example. The plurality of liquid containers 18 stores, as different types of liquid, ink of colors such as cyan, magenta, yellow, and black. The liquid may be pigmented ink, or may be dye ink. Alternatively, the liquid may be a coating liquid or the like.

The first liquid container 18A and the second liquid container 18B have the same basic configuration except for different width dimensions due to the different capacities. Hence, when no particular distinction is made between the first liquid container 18A and the second liquid container 18B, they are referred to simply as "liquid container 18."

In addition, the liquid ejecting apparatus 11 includes, inside the casing 20, a printing portion 23 that prints by attaching liquid such as ink onto the medium M, and a supply passage 24 formed of a tube or the like supplying the liquid in the liquid container 18 to the printing portion 23. The printing portion 23 includes the ejection head 25 that ejects liquid and a carriage 26 capable of moving back and forth along the width direction X (scanning direction) while holding the ejection head 25. The printing portion 23 prints on the medium M by ejecting liquid toward the medium M from the moving ejection head 25.

The liquid ejecting apparatus 11 of the present embodiment includes a plurality of liquid containers 18 supplying liquid to the ejection head 25. The plurality of liquid containers 18 are capable of storing the liquid supplied to the ejection head 25. The liquid ejecting apparatus 11 includes the ejection head 25 and the casing 20 accommodating the plurality of liquid containers 18. The liquid ejecting apparatus 11 also includes fixing portions 42 that fix the plurality of liquid containers 18 to the casing 20. That is, the plurality of liquid containers 18 is fixed to the casing 20 via the fixing portions 42.

The liquid ejecting apparatus 11 includes, in the casing 20, a scanning mechanism 27 that causes the printing portion 23 to move (scan). The scanning mechanism 27 has a guide shaft 28 that guides the carriage 26 so as to be movable in the width direction X, a carriage motor 29 which is a drive source, a pair of pulleys 30, and an endless timing belt 31 wound around the pair of pulleys 30. Of the pair of pulleys 30, one is fixed to an output shaft of the carriage motor 29. When the carriage motor 29 is driven forward, the printing portion 23 moves back and forth in the +X direction, and when the carriage motor 29 is driven in reverse, the printing portion 23 moves back and forth in the −X direction.

The casing 20 accommodates the liquid container 18, the supply passage 24, the ejection head 25, the carriage 26, the scanning mechanism 27, and the like. A plurality of supply passages 24 is provided individually corresponding to the liquid containers 18. That is, the plurality of liquid containers 18 supplies different colored liquids to the printing portion 23 through a plurality of supply passages 24.

Figure 2:
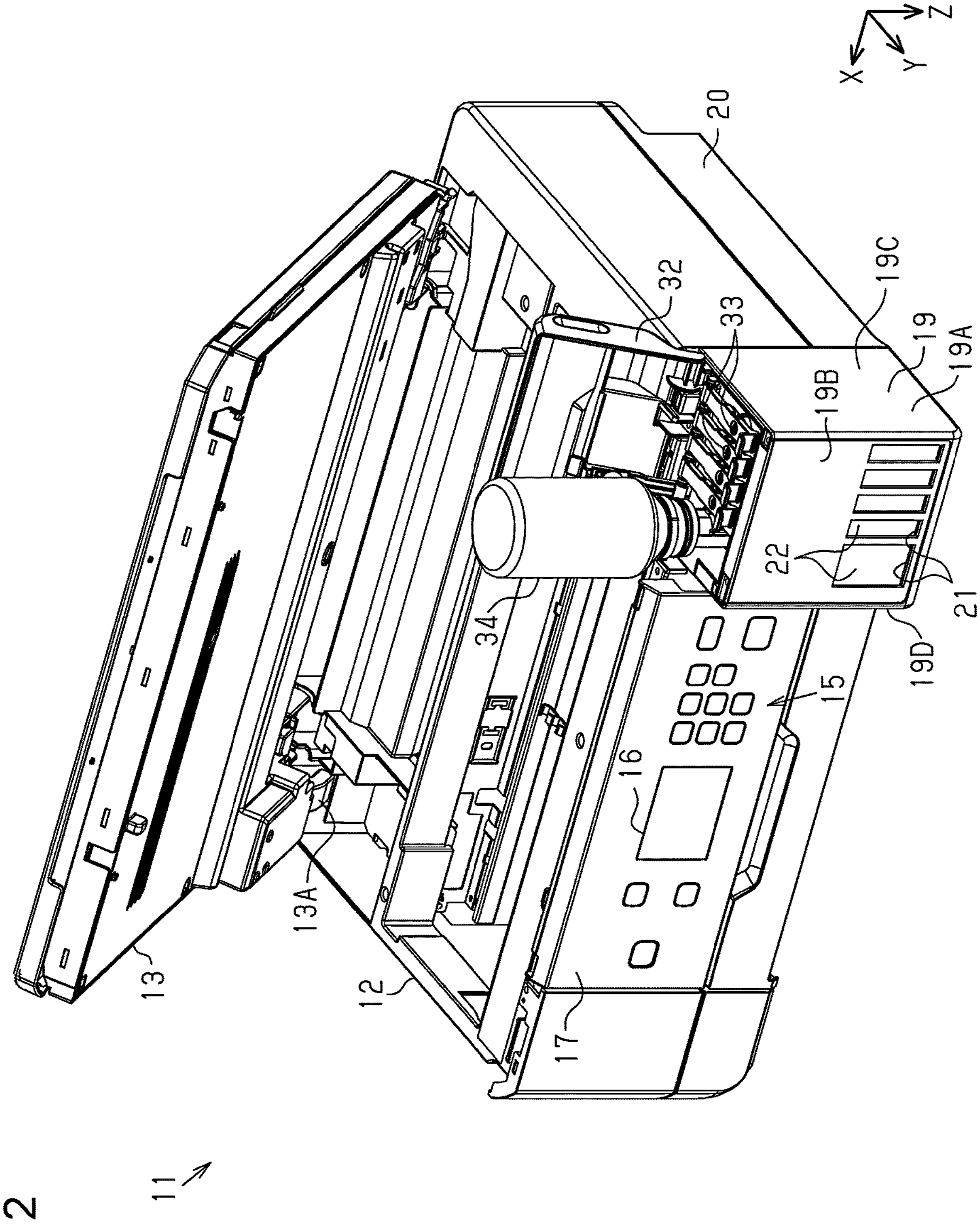
FIG. 2 is a perspective view illustrating the liquid ejecting apparatus when a liquid container is refilled with liquid.

As illustrated in FIG. 2, the image reading apparatus 13 is openable and closable between a closed position illustrated in FIG. 1 and an open position illustrated in FIG. 2 with respect to the liquid ejecting apparatus 11 via a rotating mechanism 13A such as a hinge. When the image reading apparatus 13 is set in the open position, the cover 32 and a cap lever 33 attached to the liquid container 18 (see FIG. 1) are openable and closable. When refilling the liquid container 18 with liquid such as ink, as illustrated in FIG. 2, the image reading apparatus 13, the cover 32, and the cap lever 33 are set in the open position. A supply port of a liquid bottle 34 is coupled to a liquid filler port of the liquid container 18 with the liquid bottle 34 in an upside-down position and the supply port facing down. Note that while the cover 32 is configured to be openable and closable when the image reading apparatus 13 is in the open state, the cover 32 may be configured to be openable and closable on its own when the image reading apparatus 13 is in the closed state.

Internal configuration of liquid ejecting apparatus 11

Figure 3:
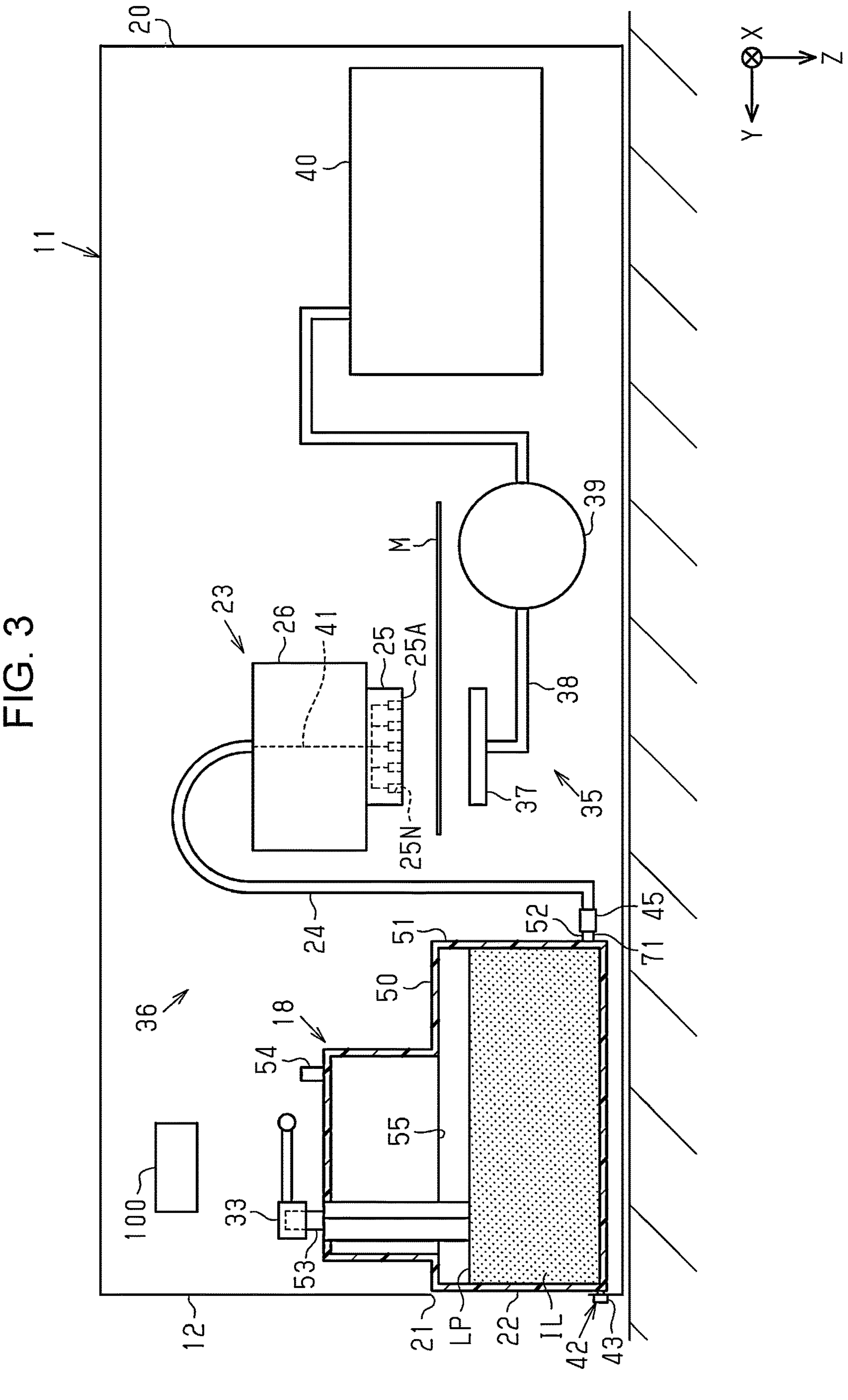
FIG. 3 is a schematic cross-sectional view illustrating an internal configuration of the liquid ejecting apparatus.

Next, an internal configuration of the liquid ejecting apparatus 11 will be described with reference to FIG. 3. As illustrated in FIG. 3, the ejection head 25 includes a nozzle forming surface 25A on which a nozzle 25N opens. In the example illustrated in FIG. 3, a plurality of nozzles 25N opens on the nozzle forming surface 25A. The ejection head 25 is capable of ejecting liquid from a plurality of nozzles 25N. For example, a plurality of nozzles 25N may be provided for each type (e.g., color) of liquid to be ejected.

The liquid ejecting apparatus 11 includes a maintenance device 35 that performs maintenance of the ejection head 25, and a liquid supply device 36 that supplies liquid to the ejection head 25 from the liquid container 18. The maintenance device 35 includes a cap 37 that can be raised and lowered with respect to the ejection head 25 in a standby position, and a discharge tube 38 coupled to the cap 37. The cap 37 is movable between a retracted position illustrated in FIG. 3 away from the ejection head 25 and a capping position (not illustrated) where the cap 37 comes into contact with the nozzle forming surface 25A of the ejection head 25. The cap 37 can receive liquid ejected or discharged from the nozzle 25N for maintenance.

When in the capping position, the cap 37 forms, with the nozzle forming surface 25A, a closed space connected to the nozzle 25N. The maintenance device 35 includes a suction pump 39 interposed in the middle of the discharge tube 38. The maintenance device 35 drives the suction pump 39 while capping the ejection head 25, and decompresses the closed space surrounded and formed by the cap 37 and the nozzle forming surface 25A. The decompression causes foreign matter such as air bubbles to be sucked out from the nozzle 25N of the ejection head 25 together with the liquid. The liquid discharged from the nozzle 25N by the cleaning is collected in a liquid waste storage portion 40 through the cap 37 and the discharge tube 38.

As illustrated in FIG. 3, while a plurality of liquid supply devices 36 is provided for the plurality of liquid containers 18, FIG. 3 illustrates one liquid supply device 36 including one liquid container 18. Since the plurality of liquid supply devices 36 basically has the same configuration, a configuration of one liquid supply device 36 will be described below.

As illustrated in FIG. 3, the liquid supply device 36 includes the liquid container 18 and the supply passage 24 that supplies liquid in the liquid container 18 to the ejection head 25. The supply passage 24 may be an elastically deformable tube, or may be formed inside a passage forming member made of a hard resin material. Alternatively, the supply passage 24 may include a part formed by adhering a film on a passage forming member in which a groove is formed.

An upstream end portion (one end portion) of the supply passage 24 is coupled to the liquid container 18. A downstream end portion (other end portion) of the supply passage 24 is coupled to an upstream end portion of a liquid passage 41 of the carriage 26. The liquid in the liquid container 18 is sent to the ejection head 25 through the supply passage 24 and the liquid passage 41.

The liquid container 18 includes a container main body 50. The container main body 50 is formed of a synthetic resin case. Moreover, the case forming the container main body 50 is made of transparent or semi-transparent resin. Hence, the liquid level of the liquid stored in a liquid compartment 55 can be viewed from the outside through the viewing surface 22 on a front surface of the container main body 50. The liquid container 18 is fixed to the liquid ejecting apparatus 11 with the fixing portion 42. For example, the fixing portions 42 are formed of screws 43 or the like that fix the liquid container 18 directly or via an attachment member (not illustrated) to a frame forming the casing 20. Incidentally, the container main body 50 may be formed such that a film is fixed on one surface of a storage case having a compartment recess portion recessed from a surface, and the liquid compartment 55 is surrounded by the film and the compartment recess portion.

Each of the plurality of liquid containers 18 has the liquid storage portion 51 capable of storing liquid, the liquid supply portion 52, and the liquid discharge portion 71 that discharges the liquid stored in the liquid storage portion 51 to the outside. The liquid supply portion 52 is a part to which one end portion of the supply passage 24 supplying liquid to the ejection head 25 is directly or indirectly coupled. The liquid supply portion 52 supplies liquid in the liquid storage portion 51. Furthermore, each of the plurality of liquid containers 18 has a liquid pouring portion 53 that pours liquid into the liquid storage portion 51. The liquid supply portion 52 of the present embodiment is a part to which one end portion of the supply passage 24 supplying liquid to the ejection head 25 is directly or indirectly coupled. In this example, the liquid supply portion 52 also serves as the liquid discharge portion 71. A connection portion 45 is fixed to the upstream end portion of the supply passage 24. The liquid supply portion 52 is connected to the supply passage 24 by being coupled to the connection portion 45.

As illustrated in FIG. 3, at least a part of the liquid container 18 is located lower than the ejection head 25. That is, the ejection head 25 is located higher than a liquid level LP in the liquid container 18 in the vertical direction Z. To be specific, an opening of the nozzle 25N is located higher than the position of the liquid level LP in the liquid container 18 at its maximum height. Note that the positional relationship of the ejection head 25 and the liquid container 18 in the vertical direction Z can be set arbitrarily as long as a liquid meniscus is formed in the nozzle 25N and liquid does not drip from the nozzle 25N.

The liquid ejecting apparatus 11 illustrated in FIG. 3 includes a controller 100 that controls the overall operation. The controller 100 controls the carriage motor 29 that moves the carriage 26 back and forth, a transport portion (not illustrated) that transports the medium M, an ejection operation of the ejection head 25, a cleaning operation of the maintenance device 35, and the like.

Figure 4:
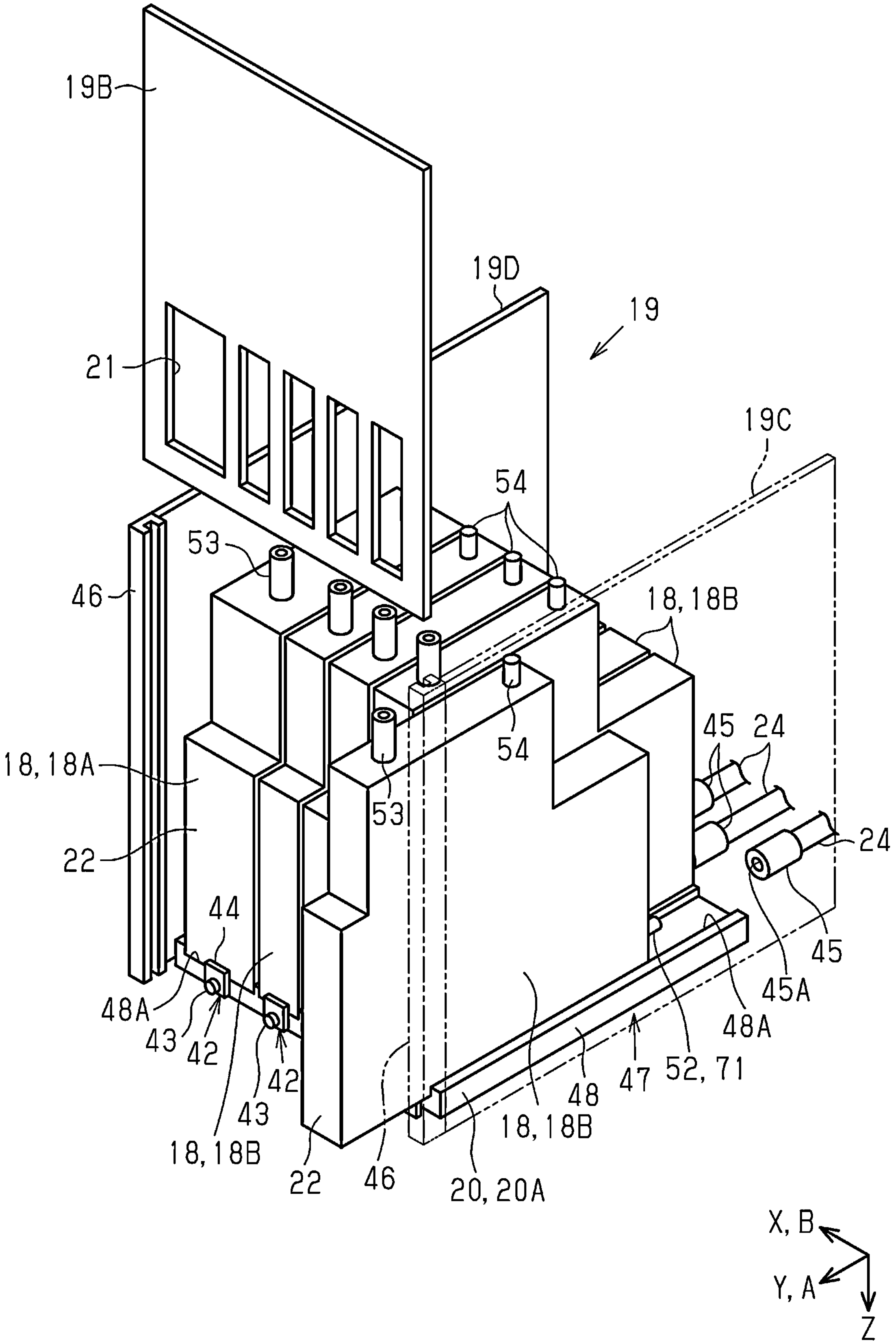
FIG. 4 is a schematic perspective view illustrating how a liquid container is removed from a storage portion.

As illustrated in FIG. 4, in the storage portion 19, there is provided a separating mechanism 47 capable of separating the liquid container 18 from the casing 20 individually in a state where fixing of the liquid container 18 to the casing 20 by the fixing portions 42 is released. The separating mechanism 47 can separate the liquid container 18 from the casing 20 individually in a first direction A. The first direction A is a direction in which the liquid supply portion 52 can be separated from the one end portion of the supply passage 24.

The separating mechanism 47 includes a mounting portion 48 forming at least a part of a bottom portion 20A of the casing 20. An upper surface of the mounting portion 48 is a mounting surface on which the plurality of liquid containers 18 is mounted side by side in a second direction B intersecting the first direction A which is the separating direction. A guide portion 48A extending in the first direction A with a slightly larger width dimension than the width dimension of the liquid container 18 is provided in the mounting surface of the mounting portion 48. In the example illustrated in FIG. 4, the guide portion 48A is a slide groove recessed from the upper surface of the mounting portion 48. The slide groove is a guide groove extending along the first direction A. The guide groove is a groove that penetrates at least on the first direction A side. Note that the guide portion 48A is not limited to a guide groove such as the slide groove, and may be a rail that engages with a rail groove recessed from a bottom surface of the liquid container 18 and capable of guiding the liquid container 18 in the first direction A.

The fixing portions 42 are formed of the screws 43 and restriction members 44. The fixing portions 42 are fixed to a front surface of the mounting portion 48 while restricting movement of the liquid container 18 in the first direction A. Note that the fixing portions 42 may fix the liquid container 18 to the mounting portion 48 by engagement via the restriction members 44.

The storage portion 19 has the door body 19B. The door body 19B is movable between a shielding position covering the first direction A side of the plurality of liquid containers 18 and an open position not covering the first direction A side thereof with respect to the casing 20. The door body 19B has the window portion 21 that allows the user to view the remaining amount of liquid in the liquid container 18.

When the door body 19B is in the open position, the user can pull the liquid container 18 out of the storage portion 19 in the first direction A. The separating mechanism 47 has the guide portion 48A capable of guiding the liquid containers 18 individually in the first direction A. With the guide portion 48A, the user can move the liquid containers 18 individually in the first direction A. When the user moves the liquid container 18 in the first direction A, the liquid supply portion 52 is separated from the one end portion of the supply passage 24. That is, the coupling between the liquid supply portion 52 and a coupling port 45A of the connection portion 45 is disconnected. Configuration of liquid container 18

Next, a configuration of the liquid container 18 will be described with reference to FIG. 7. Note that the first liquid container 18A and the second liquid container 18B have different width dimensions due to the difference in capacity, but the basic configuration is the same. Hence, in the following description, the first liquid container 18A and the second liquid container 18B will be described as a liquid container 18 without making particular distinction between the two.

Figure 7:
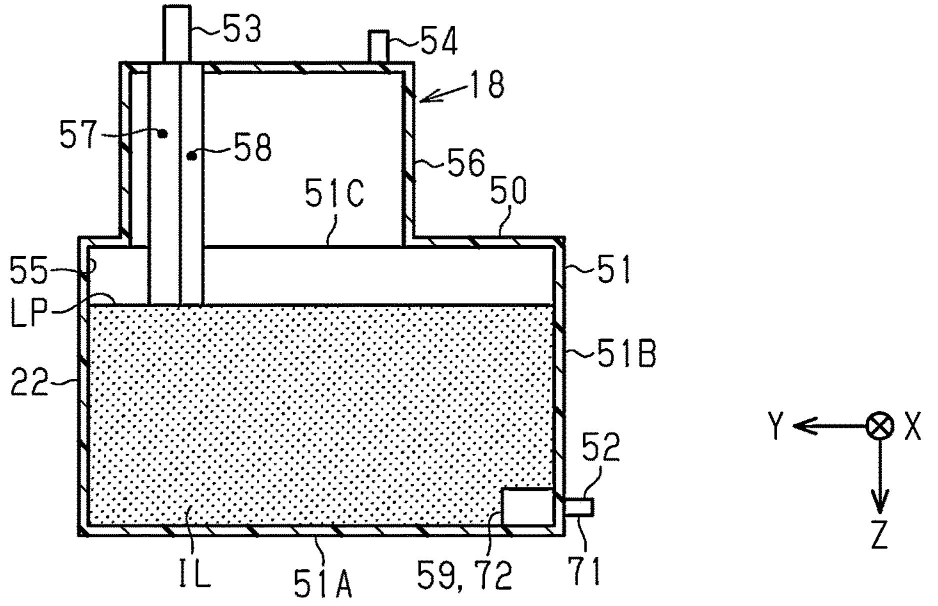
FIG. 7 is a schematic cross-sectional view illustrating the liquid container.
Figure 8:
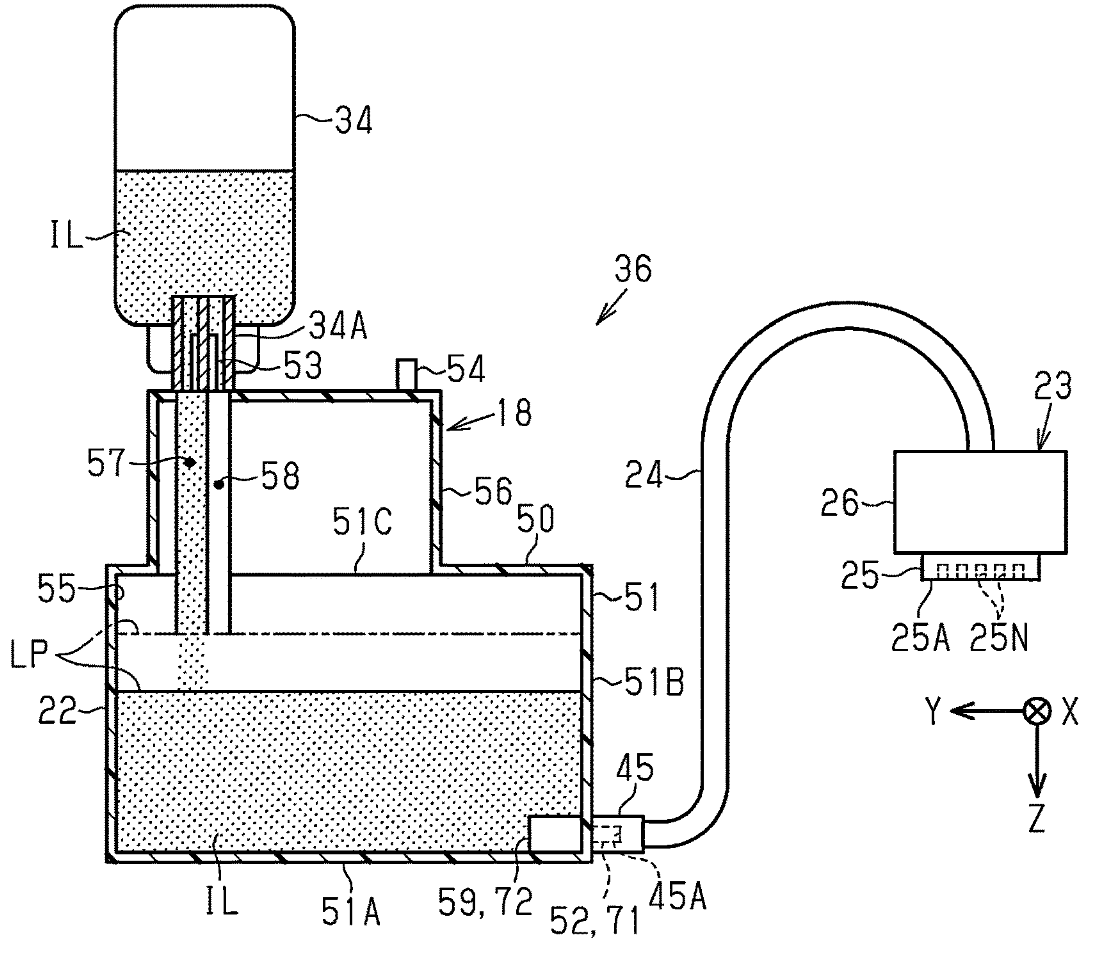
FIG. 8 is a schematic side cross-sectional view illustrating a liquid container and an ejection head.

As illustrated in FIGS. 7 and 8, the container main body 50 has the liquid storage portion 51 having the liquid compartment 55, and a protruding portion 56 protruding from the upper side of the liquid storage portion 51. The container main body 50 has, as pipe-shaped parts protruding outward, the liquid supply portion 52, the liquid pouring portion 53, and an atmospheric connection portion 54. The liquid supply portion 52, the liquid pouring portion 53, and the atmospheric connection portion 54 are connected to the liquid compartment 55. A liquid IL is stored in the liquid compartment 55.

The liquid pouring portion 53 is used to pour liquid such as ink into the liquid compartment 55. The liquid pouring portion 53 and the liquid compartment 55 are coupled via a liquid passage 57 and an air passage 58. The liquid pouring portion 53 is connected to both of the liquid passage 57 and the air passage 58. Liquid compartment 55-side end portions (lower ends) of the liquid passage 57 and the air passage 58 are located at the highest liquid level.

The atmospheric connection portion 54 connects an air area above the liquid level LP in the liquid compartment 55 to the atmosphere. The container main body 50 has a partition wall portion 51C that separates the liquid storage portion 51 and the protruding portion 56 on the inside of the container main body 50. A connection path between the liquid compartment 55 and the atmospheric connection portion 54 partially includes thin meandering pores. Accordingly, the liquid compartment 55 is connected to the atmospheric connection portion 54 while moisture of the liquid stored in the liquid compartment 55 does not evaporate easily.

As illustrated in FIG. 8, when pouring liquid into the liquid container 18, a supply portion 34A is coupled to the liquid pouring portion 53 with the liquid bottle 34 in an upside-down position. The inside of the liquid bottle 34 coupled to the liquid pouring portion 53 is connected to the liquid compartment 55 through both of the liquid passage 57 and the air passage 58. Hence, the liquid in the liquid bottle 34 is poured into the liquid container 18 through the liquid passage 57 while the air in the liquid compartment 55 is sent into the liquid bottle 34 through the air passage 58. This gas-liquid exchange allows the liquid to be continuously poured into the liquid compartment 55 from the liquid bottle 34 until the liquid level LP reaches the lower end of the air passage 58. Then, when the liquid level LP reaches the lower end of the air passage 58, the gas-liquid exchange is no longer performed and the pouring of the liquid into the liquid compartment 55 from the liquid bottle 34 stops. Thus, when the liquid level LP reaches the highest liquid level, pouring of the liquid into the liquid container 18 is stopped. Note that when liquid is poured into the liquid container 18 from the liquid bottle 34, the air in the liquid compartment 55 is discharged from the atmospheric connection portion 54.

As illustrated in FIGS. 7 and 8, in the liquid container 18 of the first embodiment, the liquid supply portion 52 also serves as the liquid discharge portion 71. The liquid discharge portion 71 is arranged in a bottom surface 51A or a lower portion of a side surface 51B of the liquid storage portion 51. Hence, the liquid supply portion 52 also serving as the liquid discharge portion 71 is arranged in the bottom surface 51A or a lower portion of the side surface 51B of the liquid storage portion 51. Note that in the example illustrated in FIGS. 7 and 8, the liquid supply portion 52 also serving as the liquid discharge portion 71 is arranged in a lower portion of the side surface 51B of the liquid storage portion 51.

Here, a lower portion of the side surface 51B may be half the height of the highest liquid level in the liquid storage portion 51 or lower, for example. It goes without saying that if the liquid discharge portion 71 is located as low as possible in the liquid compartment 55, more liquid can be discharged using the hydraulic head pressure between the liquid level in the liquid storage portion 51 and a discharge port of the liquid discharge portion 71. However, a small amount of liquid left in the liquid storage portion 51 can also be discharged by tilting the liquid container 18. Hence, it is sufficient that the liquid discharge portion 71 is located at a height where it can discharge at least a part of the liquid using hydraulic head pressure when there is half or more liquid remaining in the liquid storage portion 51.

As illustrated in FIGS. 7 and 8, a bottom surface of the liquid compartment 55 is tilted such that its height is lower on the opposite side of the viewing surface 22 in the depth direction Y. Hence, the liquid in the liquid container 18 is easily supplied to the outside from the liquid supply portion 52 until the end. Note that the inside of the liquid compartment 55 may be partitioned into a plurality of compartments connected to each other by a plurality of ribs (not illustrated). In this case, when the liquid ejecting apparatus 11 is transported, for example, shaking of the liquid in the liquid compartment 55 is curbed, and air (bubbles) in the liquid due to bubbling caused by shaking or the like is curbed.

When the liquid supply portion 52 is connected (coupled) to the connection portion 45, the liquid supply portion 52 is coupled to the coupling port 45A of the connection portion 45. In the liquid container 18, the liquid supply portion 52 includes a first valve 59 capable of opening and closing a passage supplying liquid. In other words, in the first embodiment in which the liquid supply portion 52 also serves as the liquid discharge portion 71, the liquid discharge portion 71 has a second valve 72 capable of opening and closing a passage discharging liquid. Here, the liquid supply portion 52 is a part having a discharge port for supplying the liquid in the liquid container 18 to the ejection head 25. On the other hand, the liquid discharge portion 71 is a part having a discharge port for discharging the residual liquid in the liquid container 18 to the outside when disposing of the liquid ejecting apparatus 11, for example. The liquid supply portion 52 and the liquid discharge portion 71 both have the function of discharging the liquid in the liquid container 18, although the discharge destination is either the ejection head 25 or the outside. Hence, one unit can serve as both the liquid supply portion 52 and the liquid discharge portion 71.

The first valve 59 is in a closed-valve state in a non-coupled state illustrated in FIG. 7 where the liquid supply portion 52 is not coupled to the connection portion 45 fixed to the upstream end portion of the supply passage 24. On the other hand, the first valve 59 is in an open-valve state in a coupled state illustrated in FIG. 8 where the liquid supply portion 52 is coupled to the connection portion 45 of the supply passage 24. The first valve 59 is automatically switched between open and closed states depending on whether or not the liquid supply portion 52 and the connection portion 45 are coupled to each other.

The first valve 59 may be configured in the following manner, for example. The first valve 59 has a valve body (not illustrated) energized in a direction of advancing outward by an energizing member (not illustrated) while being advanceable and retractable in axial direction of the liquid supply portion 52, and a valve seat on which the energized valve body abuts (not illustrated). For example, when the connection portion 45 is coupled to the liquid supply portion 52, the valve body at the back of the liquid supply portion 52 is separated from the valve seat by a force received from the connection portion 45, whereby the first valve 59 is switched to the open-valve state from the closed-valve state. When the connection portion 45 is removed from the liquid supply portion 52, the valve body comes into contact with the valve seat by the energizing force of the energizing member, so that the first valve 59 is switched to the closed-valve state from the open-valve state. Hence, the connection portion 45 can be attached and detached to and from the liquid supply portion 52 while curbing liquid leakage.

Moreover, when disposing of the liquid ejecting apparatus 11, for example, the first valve 59 also functions as the second valve 72. The second valve 72 has a function of opening and closing the discharge passage of the liquid discharge portion 71 when discharging the liquid in the liquid container 18 to the outside other than the ejection head 25. The second valve 72 may have the following structure, for example. The second valve 72 has a valve body energized by an energizing member (not illustrated) in a direction of advancing outward while being advanceable and retractable in its axial direction, and a valve seat on which the energized valve body abuts. For example, when a collection coupling portion 62 of a liquid collection container 60 described later is coupled to the liquid discharge portion 71, the valve body is separated from the valve seat by a force received from the collection coupling portion 62, whereby the second valve 72 is switched to the open-valve state from the closed-valve state. Moreover, when the collection coupling portion 62 is removed from the liquid discharge portion 71, the valve body comes into contact with the valve seat by the energizing force of the energizing member, so that the second valve 72 is switched to the closed-valve state from the open-valve state. Hence, the collection coupling portion 62 can be attached and detached to and from the liquid discharge portion 71 while curbing liquid leakage.

Configuration of Liquid Ejecting System

In the present embodiment, the liquid ejecting system is formed of the liquid ejecting apparatus 11 and the liquid collection container 60 (hereinafter also referred to simply as "collection container 60."). The liquid ejecting apparatus 11 and the collection container 60 may be sold as a set, or the user may obtain the collection container 60 for a fee or free of charge at the stage of disposal of the liquid ejecting apparatus 11. Alternatively, a recessed portion may be provided in the casing 20 of the liquid ejecting apparatus 11, and the collection container 60 may be inserted into the recessed portion. An opening of the recessed portion may be covered with a cover. The cover may be removed to take the collection container 60 out of the recessed portion for use when disposing of the liquid ejecting apparatus 11.

Figure 10:
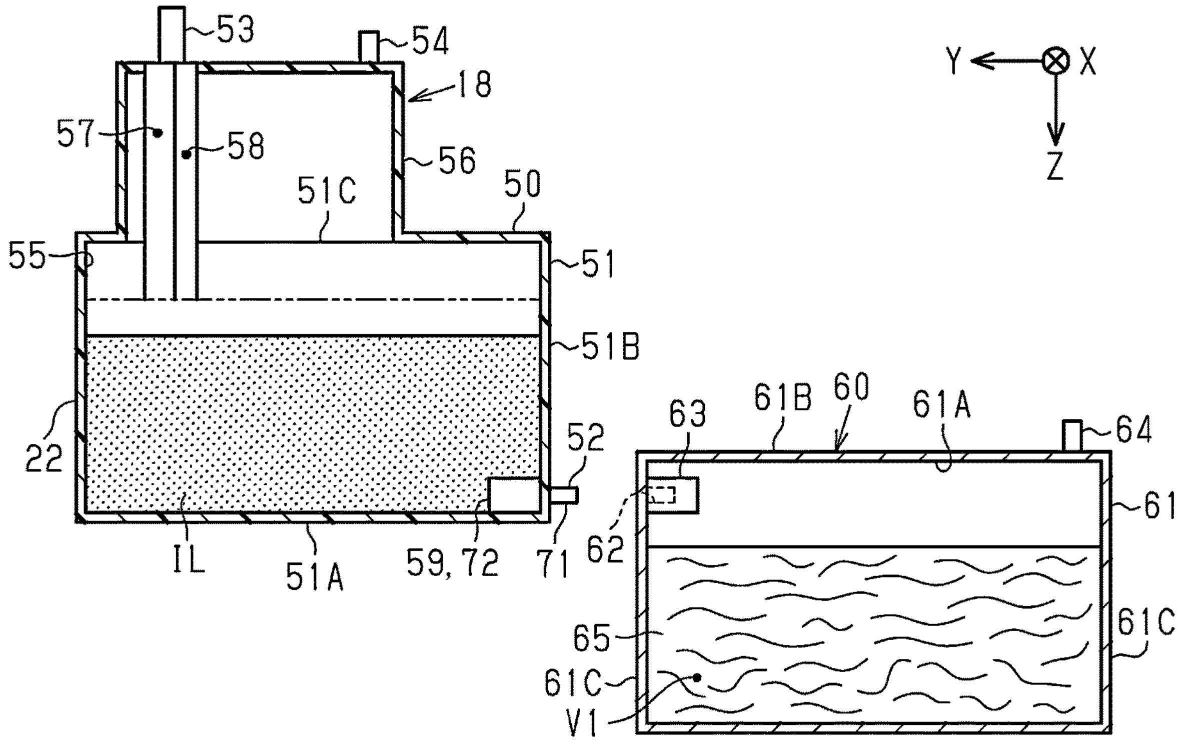
FIG. 10 is a schematic side cross-sectional view illustrating a liquid container and a liquid collection container.
Figure 11:
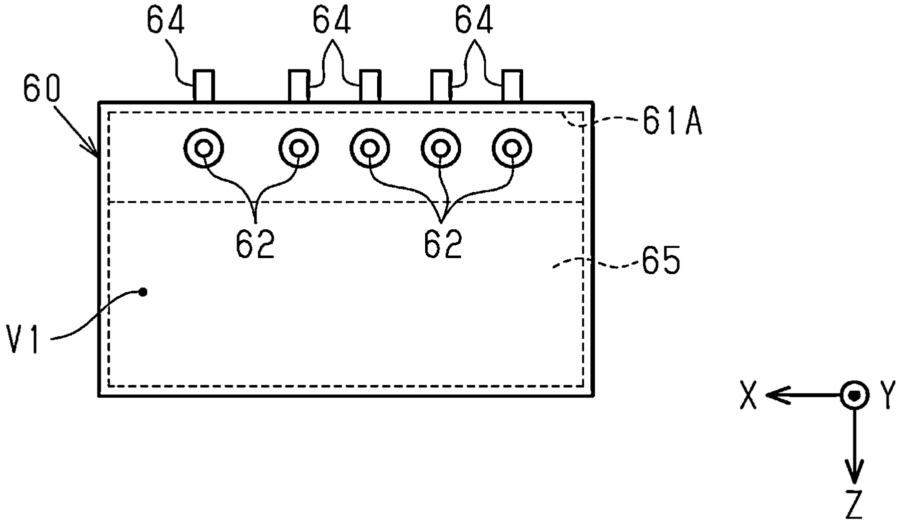
FIG. 11 is a schematic front view illustrating a liquid collection container.

As illustrated in FIGS. 10 and 11, the collection container 60 includes the collection coupling portion 62 that can be coupled to the liquid discharge portion 71 of the liquid container 18, a collection container portion 61 that stores liquid, and an atmospheric connection portion 64 that connects the inside of the collection container portion 61 to the atmosphere. The liquid collected through the coupling between the liquid discharge portion 71 and the collection coupling portion 62 from the liquid container 18 is stored in the collection container portion 61.

As illustrated in FIG. 11, in an upper portion of a side surface of the collection container 60, the same number of collection coupling portions 62 as the number of liquid containers 18 in one liquid ejecting apparatus 11 are provided at intervals in the width direction X. These intervals correspond to the width dimensions of the plurality of liquid containers 18. Hence, a plurality of liquid containers 18 can be coupled to the collection container 60 simultaneously. The atmospheric connection portion 64 protrude upward from an upper surface of the collection container portion 61. The atmospheric connection portion 64 is connected to a collection compartment 61A. Note that if there is one collection compartment 61A in the collection container 60, the number of atmospheric connection portions 64 may be one or more.

Among a plurality of liquid containers 18, at least one liquid container 18 separated from the one end portion of the supply passage 24 is coupled to the collection container 60 illustrated in FIG. 10. As illustrated in FIG. 11, the liquid discharge portion 71 of the liquid container 18 and the collection coupling portion 62 of the collection container 60 are coupled to each other. The liquid in the liquid container 18 can be collected in the collection container 60 by hydraulic head pressure.

Collection of Liquid in Liquid Container 18

Next, a configuration and processing for collecting liquid in the liquid container 18 will be described with reference to FIGS. 9 to 12.

Figure 9:
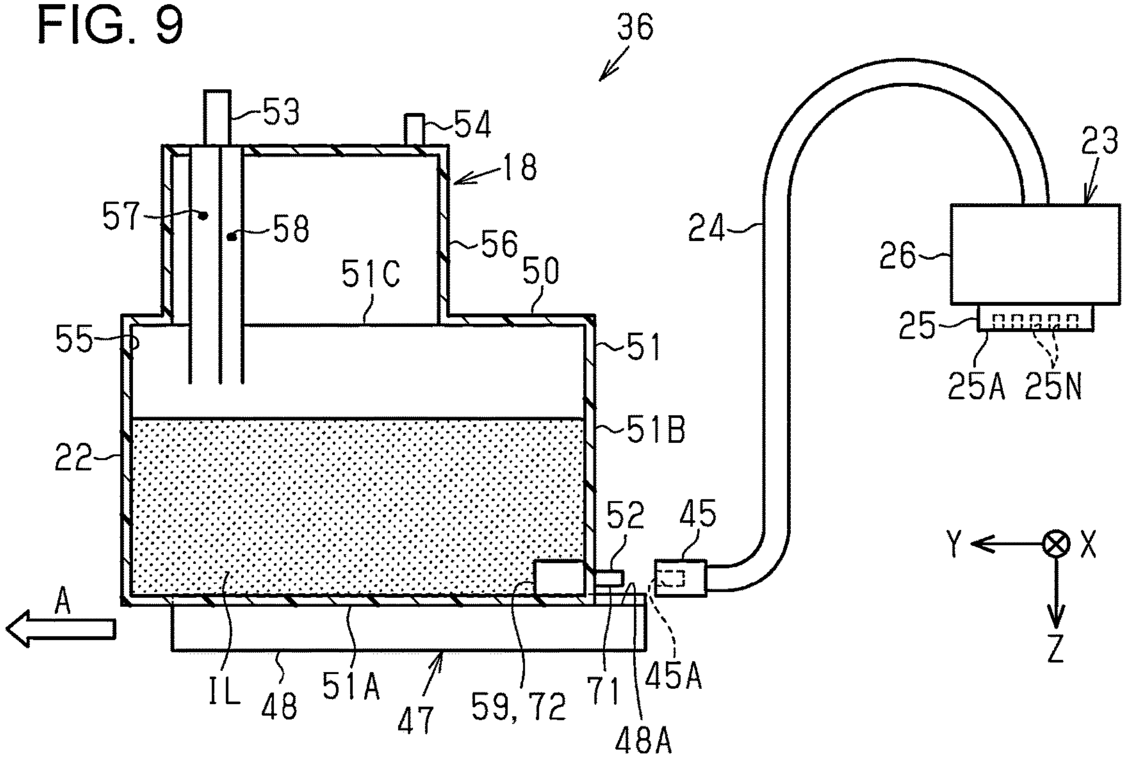
FIG. 9 is a schematic side cross-sectional view illustrating a process of moving a liquid container and releasing coupling with a supply passage.

In a first example, the liquid container 18 can be pulled out of the casing 20 of the liquid ejecting apparatus 11 along the coupling direction of the liquid supply portion 52 and the supply passage 24. As described earlier, the door body 19B (see FIG. 1) forming the front surface portion of the storage portion 19 is attachable and detachable, and is removed by sliding the door body 19B in the upper direction-Z or the width direction X. Thereafter, as illustrated in FIG. 9, the liquid container 18 is moved in a first direction indicated by a white arrow in FIG. 9 which is the coupling direction of the liquid supply portion 52 and the connection portion 45. This movement of the liquid container 18 in the first direction removes the connection portion 45 from the liquid supply portion 52. At this time, the first valve 59 is switched to the closed-valve state from the open-valve state. Therefore, as illustrated in FIG. 9, leakage of liquid from the liquid supply portion 52 is curbed even when the liquid supply portion 52 is exposed. The liquid in the removed liquid container 18 is collected in the collection container 60 illustrated in FIG. 10, for example.

Configuration of Collection Container 60

Next, a configuration of the collection container 60 will be described with reference to FIGS. 10 to 12.

The collection container 60 illustrated in FIG. 10 is prepared by the user when disposing of the liquid ejecting apparatus 11, for example. The collection container 60 includes the collection container portion 61 that collects liquid discharged from the liquid discharge portion 71 of the liquid container 18, and the collection coupling portion 62 that can be coupled to the liquid discharge portion 71. The collection container 60 collects residual liquid in the liquid container 18 through the coupling between the liquid discharge portion 71 and the collection coupling portion 62. The collection coupling portion 62 is located in an upper surface 61B or an upper portion of a side surface 61C of the collection container portion 61. In the example illustrated in FIG. 10, the collection coupling portion 62 is located in an upper portion of the side surface 61C of the collection container portion 61. The collection container portion 61 includes the collection compartment 61A.

In the collection container 60, the collection coupling portion 62 may include a third valve 63 that opens and closes a passage for collecting liquid. For example, in a non-coupled state illustrated in FIG. 10 where the collection coupling portion 62 is not coupled to the liquid discharge portion 71 on the liquid container 18 side, the third valve 63 is in a closed-valve state. On the other hand, in a coupled state illustrated in FIG. 12 where the collection coupling portion 62 is coupled to the liquid discharge portion 71, the third valve 63 is in an open-valve state. Thus, the third valve 63 may be automatically switched between open and closed states depending on whether or not the liquid discharge portion 71 and the collection coupling portion 62 are coupled to each other.

For example, the collection coupling portion 62 side has a valve body (not illustrated) that is displaced against the energizing force of an energizing member when the liquid discharge portion 71 is coupled to the collection coupling portion 62, and the displaced valve body separating from a valve seat (not illustrated) switches the third valve 63 to the open-valve state from the closed-valve state. Moreover, when the liquid discharge portion 71 is removed from the collection coupling portion 62, the valve body on the collection coupling portion 62 side is restored to the original position by the energizing force of the energizing member and abuts on the valve seat, whereby the third valve 63 is switched to the closed-valve state from the open-valve state.

As illustrated in FIG. 10, the collection container 60 also includes the atmospheric connection portion 64. The atmospheric connection portion 64 connects the collection compartment 61A to the outside. The atmospheric connection portion 64 connects the collection compartment 61A to the outside via an atmospheric connection path including pores formed of meandering paths.

Figure 12:
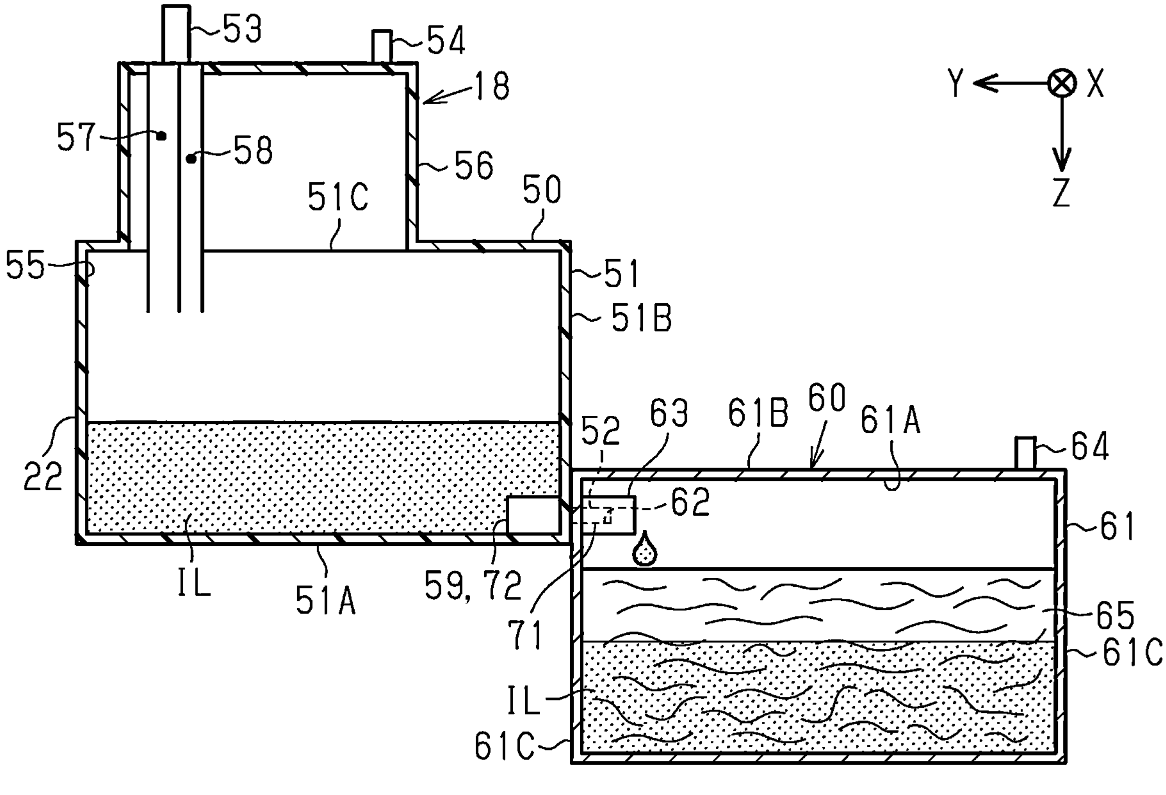
FIG. 12 is a schematic side cross-sectional view illustrating how liquid is collected in a liquid collection container from a liquid container.

As illustrated in FIG. 12, when the liquid discharge portion 71 of the liquid container 18 and the collection coupling portion 62 of the collection container 60 are coupled to each other, the liquid in the liquid container 18 is moved to the collection container 60 by hydraulic head pressure. That is, when the liquid discharge portion 71 of the liquid container 18 and the collection coupling portion 62 of the collection container 60 are coupled to each other, an inner bottom surface of the liquid compartment 55 in the liquid container 18 is set to be higher than the highest liquid level when the maximum amount of liquid is collected in the collection compartment 61A of the collection container 60. Here, the maximum amount of liquid is the sum of the maximum amounts of liquid storable in the plurality of liquid containers 18.

In addition, when the liquid discharge portion 71 and the collection coupling portion 62 are coupled to each other, an amount of air corresponding to the volume of the liquid that flowed into the collection container 60 from the liquid container 18 is discharged from the atmospheric connection portion 64, so that the liquid continuously flows into the collection container 60 from the liquid container 18. Since the capacity of the collection container 60 is larger than the maximum amount of liquid storable in the liquid container 18, the liquid does not spill on the collection container 60 side. In addition, as illustrated in FIGS. 10 and 12, the collection container 60 may have, in the collection container portion 61, a liquid holding member 65 capable of holding liquid. The liquid holding member 65 is a liquid absorbing member capable of holding liquid by absorbing the liquid. The liquid holding member 65 may be, for example, a non-woven fabric. Note that the liquid holding member 65 may be a liquid absorbing member formed of a sponge or a porous material. The liquid holding member 65 is accommodated in the collection compartment 61A in a volume capable of holding an amount of liquid corresponding to the maximum capacity of liquid stored in the liquid container 18. The collection container 60 is configured such that the liquid stored therein does not spill even if the collection container 60 is tilted because the liquid is held by the liquid holding member 65. Note that in the present embodiment, the liquid ejecting system may be formed of the collection container 60 and the liquid ejecting apparatus 11.

As illustrated in FIG. 11, a plurality of collection coupling portions 62 are provided in the collection container 60. There are the same number of collection coupling portions 62 as the liquid containers 18 assembled to the liquid ejecting apparatus 11, for example. As illustrated in FIGS. 10 and 11, the liquid storable capacity of the collection container 60 is V1. In the example of this collection container 60, although the liquid holding member 65 is provided, a liquid of a capacity V1 can be stored.

Figure 5:
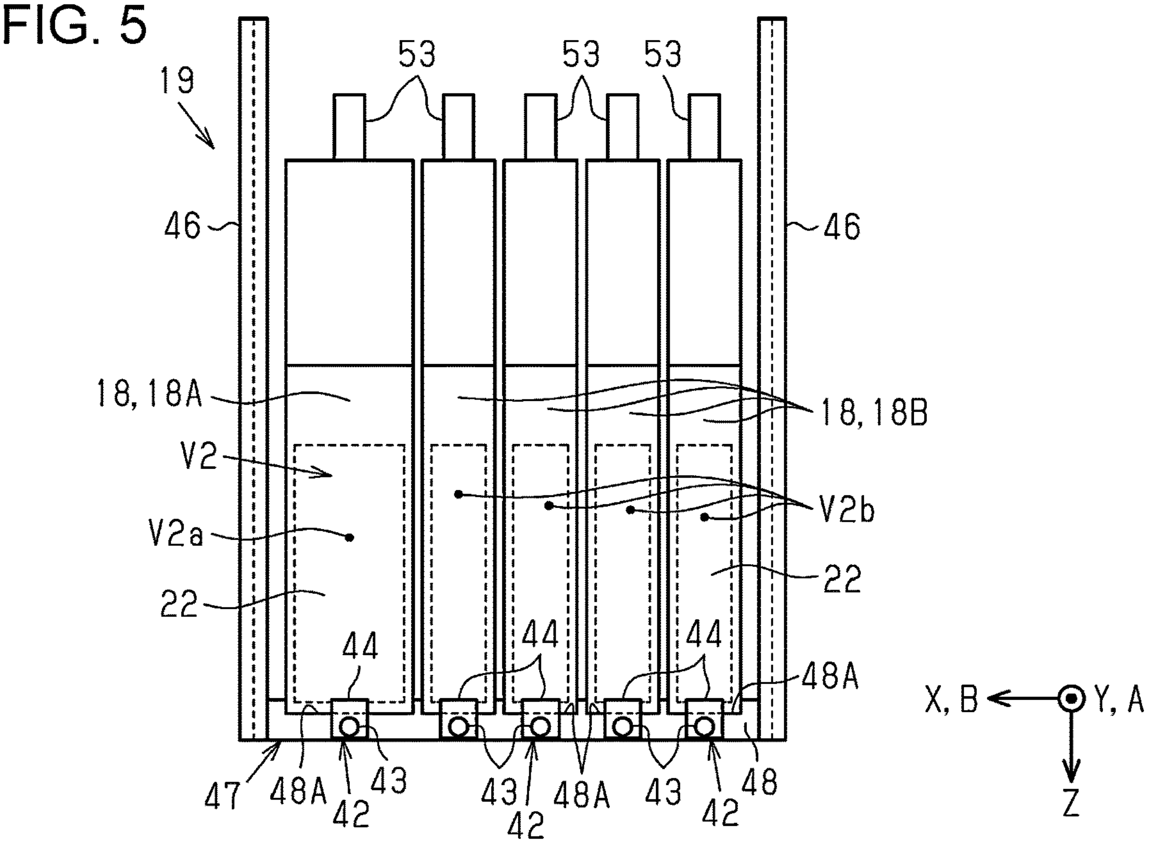
FIG. 5 is a schematic front view illustrating the storage portion in which a plurality of liquid containers is accommodated.
Figure 6:
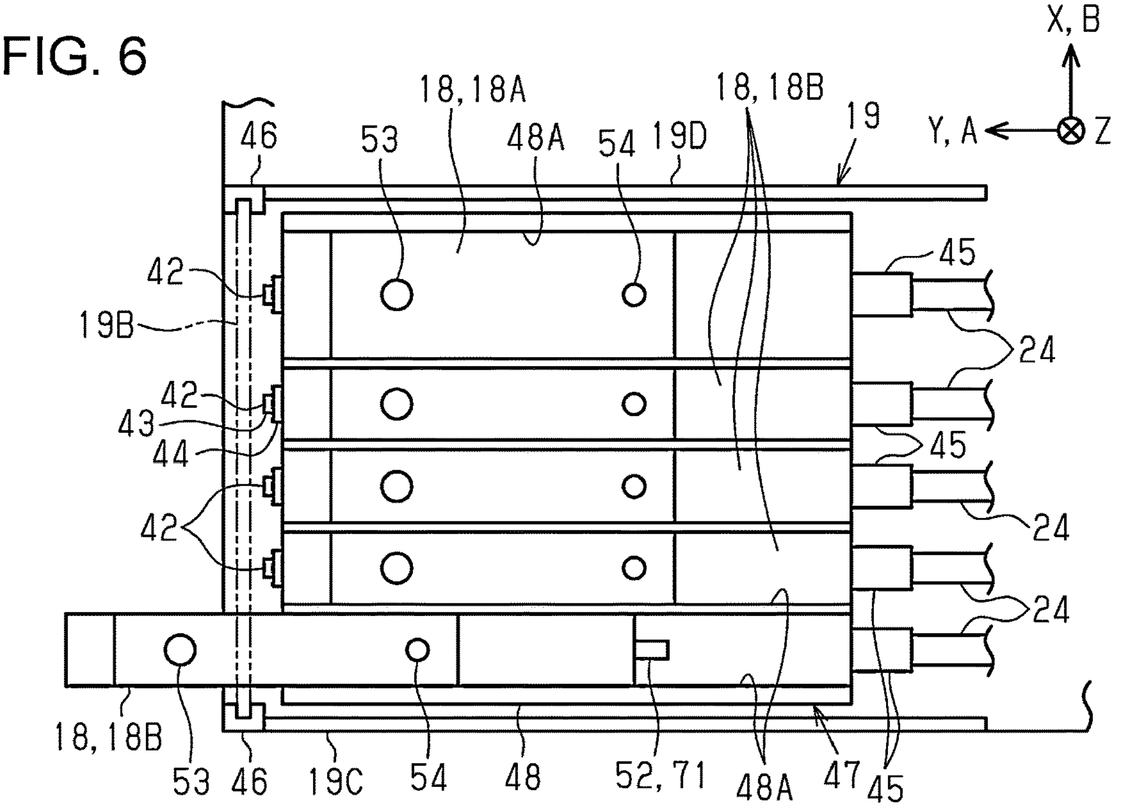
FIG. 6 is a schematic plan view illustrating how a liquid container is removed from the storage portion.

On the other hand, the total liquid capacity storable in a plurality of liquid containers 18 included in one liquid ejecting apparatus 11 is V2. The capacity V1 of the collection container 60 is set to a larger value than the total liquid capacity V2. The capacity V1 of liquid collectable by the liquid collection container 60 illustrated in FIG. 10 is larger than the total liquid capacity V2 which is the entire capacity of liquid storable in the liquid container 18 illustrated in FIG. 5. The capacity V1 of liquid collectable by the collection container 60 is set larger than the total liquid capacity V2 which is the sum of the amounts of liquid storable in the plurality of liquid containers 18. A capacity V2a of liquid storable in the first liquid container 18A and a capacity V2b of liquid storable in the second liquid container 18B are defined. The total liquid capacity V2 which is the sum of capacities of liquid storable in the plurality of liquid containers 18 is $V2=V2a+4*V2b$. The capacity V1 of the collection container 60 is set to a larger value than the total liquid capacity V2. Hence, even if all of the plurality of liquid containers 18 store the full amount of liquid, all of the liquid can be collected in the collection container 60.

Effect of First Embodiment

Next, effects of the liquid ejecting apparatus 11 including the liquid container 18 of the first embodiment will be described. Effects of a liquid ejecting system including the liquid ejecting apparatus 11 and the collection container 60 will also be described.

When disposing of the liquid ejecting apparatus 11, the user obtains the collection container 60. The collection container 60 may be packaged together with the liquid ejecting apparatus 11 at the time of purchase of the liquid ejecting apparatus 11, or the user may order the collection container 60 from a manufacturer, distributor, or the like at the time of disposal of the liquid ejecting apparatus 11. Note that the collection container 60 may be paid for or free of charge. Alternatively, the collection container 60 inserted and attached to a recessed portion of the casing 20 of the liquid ejecting apparatus 11 may be taken out of the recessed portion after removing a cover.

In the liquid ejecting apparatus 11 illustrated in FIG. 1, the user opens the image reading apparatus 13 and the cover 32 as illustrated in FIG. 2. Furthermore, the user slides the door body 19B forming the front surface portion of the storage portion 19 upward, for example, to remove it from the casing 20. When the door body 19B is removed, the front (+Y direction side) of the liquid container 18 in the storage portion 19 is opened.

Next, the fixing by the fixing portions 42 is released. To be specific, the restriction members 44 are removed by loosening the screws 43. As a result, the liquid container 18 can be moved in the first direction (+Y direction).

Next, at least one of the plurality of liquid containers 18 is moved in the first direction A individually with respect to the mounting portion 48 to separate the liquid container 18 individually from one end of the supply passage 24.

As illustrated in FIGS. 4 to 6 and 9, the user slides the liquid container 18 along the guide portion 48A on the mounting portion 48 to move the liquid container 18 in the first direction A. The user moves the liquid container 18 individually one at a time in the first direction A.

The first direction A is the coupling direction of the liquid supply portion 52 and the supply passage 24. In particular, in the present example, the first direction A is the coupling direction of the liquid supply portion 52 and the connection portion 45. The first direction A may be a direction intersecting the coupling direction of the liquid supply portion 52 and the supply passage 24 or the connection portion 45 in the range of $0<\theta\leq 20°$, for example. Thus, when the user moves the liquid container 18 in the first direction A, the coupling between the liquid supply portion 52 and the supply passage 24 or the connection portion 45 can be released without applying excessive load on any of the portions.

Moreover, since the liquid container 18 is removed one by one from the casing 20, only a small force is required to move and remove the liquid container 18 in the first direction A. That is, the force required to remove the liquid container 18 is only a force corresponding to the force required to separate one coupling between the liquid supply portion 52 and the connection portion 45. Note that two or more liquid containers 18 may be moved in the first direction A simultaneously to separate the two or more liquid containers 18 from the supply passage 24 simultaneously.

When the connection portion 45 is removed from the liquid supply portion 52, the first valve 59 is switched to the closed-valve state from the open-valve state, whereby leakage of liquid such as ink from the liquid supply portion 52 is curbed. Therefore, staining of the inside of the casing 20 with liquid such as ink is curbed as much as possible. Moreover, when the connection portion 45 is removed from the liquid supply portion 52, a valve (not illustrated) provided on the connection portion 45 side is switched to the closed-valve state from the open-valve state, whereby leakage of liquid such as ink from the connection portion 45 is also curbed.

The user may separate all of a plurality of liquid containers 18 from one end of the supply passage 24, or may selectively remove one or more liquid containers 18 after checking the remaining amount through the viewing surface 22 and determining that the liquid needs to be discharged (collected).

Next, the liquid discharge portion 71 of the liquid container 18 removed from the casing 20 and the collection coupling portion 62 of the collection container 60 are coupled to each other. This coupling switches both the second valve 72 (the same valve as the first valve 59 in the present embodiment) and the third valve 63 to the open-valve state from the closed-valve state. In this coupled state, the liquid level in the liquid container 18 is higher than the liquid level at the full amount in the collection container 60. Hence, the liquid in the liquid container 18 is moved to the collection container 60 by hydraulic head pressure. An amount of air corresponding to the volume of the liquid that flowed into the collection container 60 from the liquid container 18 is discharged from the atmospheric connection portion 64. As a result, the liquid continuously flows into the collection container 60 from the liquid container 18. The capacity V1 of the collection container 60 illustrated in FIG. 10 is larger than the total liquid capacity V2 of storable liquid in a plurality of (e.g., five) liquid containers 18 illustrated in FIG. 5. Hence, the entire liquid in the plurality of liquid containers 18 can be collected in the collection container 60. The liquid collected in the collection container 60 is absorbed by the liquid holding member 65. Hence, even if the collection container 60 is tilted after collecting the liquid, the liquid does not leak. The user assembles the liquid container 18 from which residual liquid is removed to the casing 20, and then disposes of the liquid ejecting apparatus 11.

Therefore, according to the first embodiment, the following effects can be obtained.

(1-1) The liquid ejecting apparatus 11 includes the ejection head 25 that ejects liquid, a plurality of the liquid containers 18 capable of storing liquid supplied to the ejection head 25, and the casing 20 that accommodates the ejection head 25 and the plurality of liquid containers 18. The liquid ejecting apparatus 11 also includes the fixing portion 42 that fixes the plurality of liquid containers 18 to the casing 20. Each of the plurality of liquid containers 18 has the liquid storage portion 51 capable of storing liquid, the liquid supply portion 52, and the liquid discharge portion 71. The liquid supply portion 52 is a part to which one end portion of the supply passage 24 supplying liquid to the ejection head 25 is directly or indirectly coupled. The liquid discharge portion 71 is a part that discharges the liquid stored in the liquid storage portion 51 to the outside. The liquid ejecting apparatus 11 includes the separating mechanism 47. In a state where fixing of the liquid container 18 to the casing 20 by the fixing portion 42 is released, the separating mechanism 47 can separate the liquid container 18 from the casing 20 individually in the first direction A which is a direction in which the liquid supply portion 52 can be separated from the one end portion of the supply passage 24. According to this configuration, it is possible to separate the liquid container 18 with residual liquid individually from the one end portion of the supply passage 24. That is, it is possible to selectively separate the liquid container 18 from which liquid needs to be discharged from the supply passage 24.

(1-2) The liquid discharge portion 71 is arranged in a bottom surface or a lower portion of a side surface of the liquid storage portion 51. According to this configuration, it is possible to discharge the residual liquid in the liquid container 18 in the liquid ejecting apparatus 11 to the outside from the liquid discharge portion 71 arranged in a bottom surface or a lower portion of a side surface of the liquid storage portion 51. Therefore, it is possible to dispose of the liquid ejecting apparatus 11 after discharging the residual liquid in the liquid container 18 to the outside.

(1-3) The liquid container 18 includes the first valve 59 as an example of a valve that opens and closes a passage of the liquid supply portion 52. The first valve 59 opens when the liquid supply portion 52 is coupled to the one end portion of the supply passage 24, and closes when the liquid supply portion 52 is disconnected from the one end portion of the supply passage 24. According to this configuration, the first valve 59 opens when the liquid supply portion 52 is coupled to the one end portion of the supply passage 24 supplying liquid to the ejection head 25, and the first valve 59 closes when the coupling between the liquid supply portion 52 and the one end portion of the supply passage 24 is disconnected. Therefore, it is possible to supply liquid to the ejection head 25 appropriately, and curb leakage of liquid from the liquid supply portion 52 when it is disconnected from the one end portion of the supply passage 24.

(1-4) The casing 20 includes the storage portion 19 capable of accommodating a plurality of liquid containers 18. The storage portion 19 has the window portion 21 that allows the user to view the remaining amount of liquid in the liquid container 18. The door body 19B is movable between a shielding position covering the first direction A side of the plurality of liquid containers 18 and an open position not covering the first direction A side thereof with respect to the casing 20. According to this configuration, it is possible to open the first direction A side of the plurality of liquid containers 18 by moving the door body 19B from the shielding position to the open position. Therefore, it is possible to move the plurality of liquid containers 18 in the first direction A. As a result, it is possible to pull the liquid container 18 out of the storage portion 19 and separate it directly or indirectly from the one end portion of the supply passage 24.

(1-5) With the door body 19B in the open position not covering the front surfaces of the plurality of liquid containers 18, the liquid container 18 is pulled out of the storage portion 19 by the separating mechanism 47 to be separated from the one end portion of the supply passage 24. According to this configuration, even when the liquid container 18 is accommodated in the storage portion 19, with the door body 19B in the open position, the liquid container 18 can be moved in the first direction A to disconnect the coupling between the liquid supply portion 52 and the one end portion of the supply passage 24.

(1-6) The liquid ejecting system includes the liquid ejecting apparatus 11 and the liquid collection container 60. The liquid collection container 60 includes the collection coupling portion 62, the collection container portion 61, and the atmospheric connection portion 64. The collection coupling portion 62 can be coupled to the liquid discharge portion 71 of the liquid container 18. The collection container portion 61 stores the liquid collected through the coupling between the liquid discharge portion 71 and the collection coupling portion 62 from the liquid container 18. The atmospheric connection portion 64 connects the inside of the collection container portion 61 to the atmosphere. The liquid discharge portion 71 of at least one liquid container 18 separated from the one end portion of the supply passage 24 among the plurality of liquid containers 18 is coupled to the collection coupling portion 62. In particular, in the first embodiment, it is possible to couple the liquid container 18 to the collection container 60 individually. The liquid in the liquid container 18 can be collected in the liquid collection container 60 by hydraulic head pressure. According to this configuration, it is possible to collect residual liquid in the liquid container 18 into the collection container relatively easily when disposing of the liquid ejecting apparatus 11.

Second Embodiment

Next, a configuration of a liquid container 18 and a collection container 60 of a second embodiment will be described with reference to FIGS. 13 to 21. The second embodiment is different from the first embodiment in the configuration of a separating mechanism. The basic configuration of a liquid ejecting apparatus 11 is the same as the first embodiment. Hence, in the following, the configuration of the liquid ejecting apparatus 11 will be described by assigning the same reference numerals as the first embodiment and omitting detailed descriptions, focusing mainly on the configuration and the like of the liquid container 18 and the collection container 60. Note that the configuration of the liquid container 18 and the collection container 60, too, will be described by assigning the same reference numerals to configurations common to the first embodiment and omitting detailed descriptions.

Figure 16:
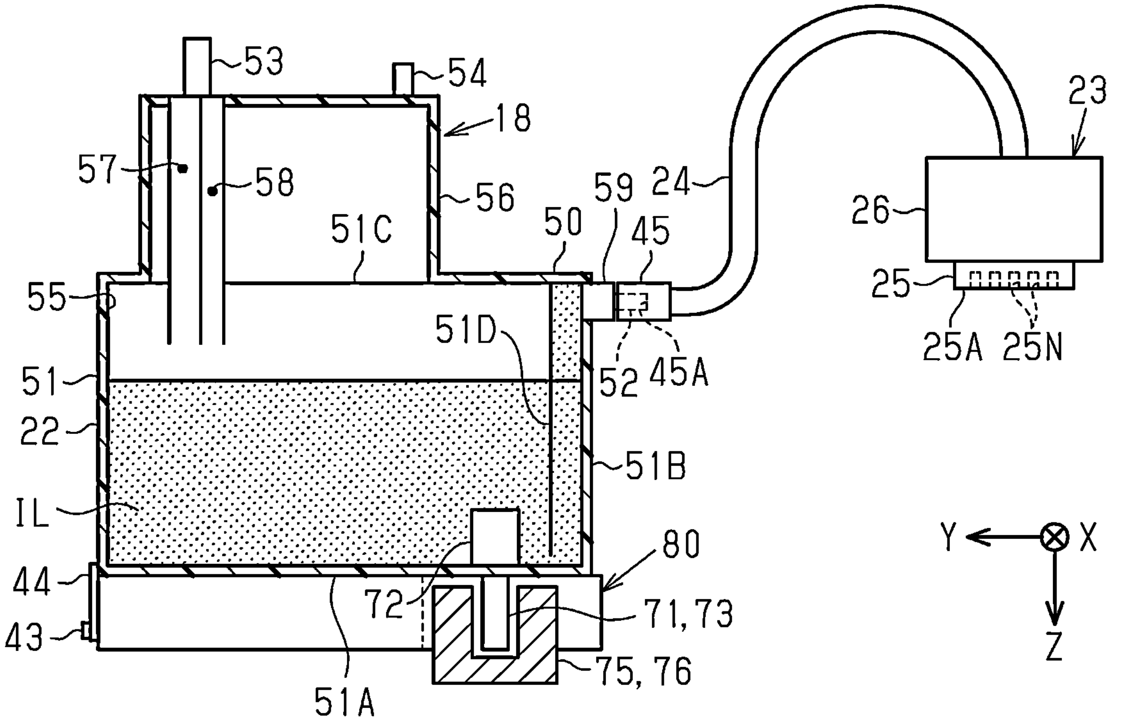
FIG. 16 is a schematic side cross-sectional view illustrating a liquid container and an ejection head.

As in the first embodiment illustrated in FIG. 1, the liquid ejecting apparatus 11 includes an ejection head 25 that ejects liquid, a plurality of liquid containers 18 capable of storing liquid supplied to the ejection head 25, and a casing 20 that accommodates the ejection head 25 and the plurality of liquid containers 18. While the liquid container 18 of the first embodiment has the liquid supply portion 52 also serving as the liquid discharge portion 71 (see FIGS. 7 and 8), as illustrated in FIG. 16, the liquid container 18 of the second embodiment includes a liquid supply portion 52 and a liquid discharge portion 71 separately.

Figure 13:
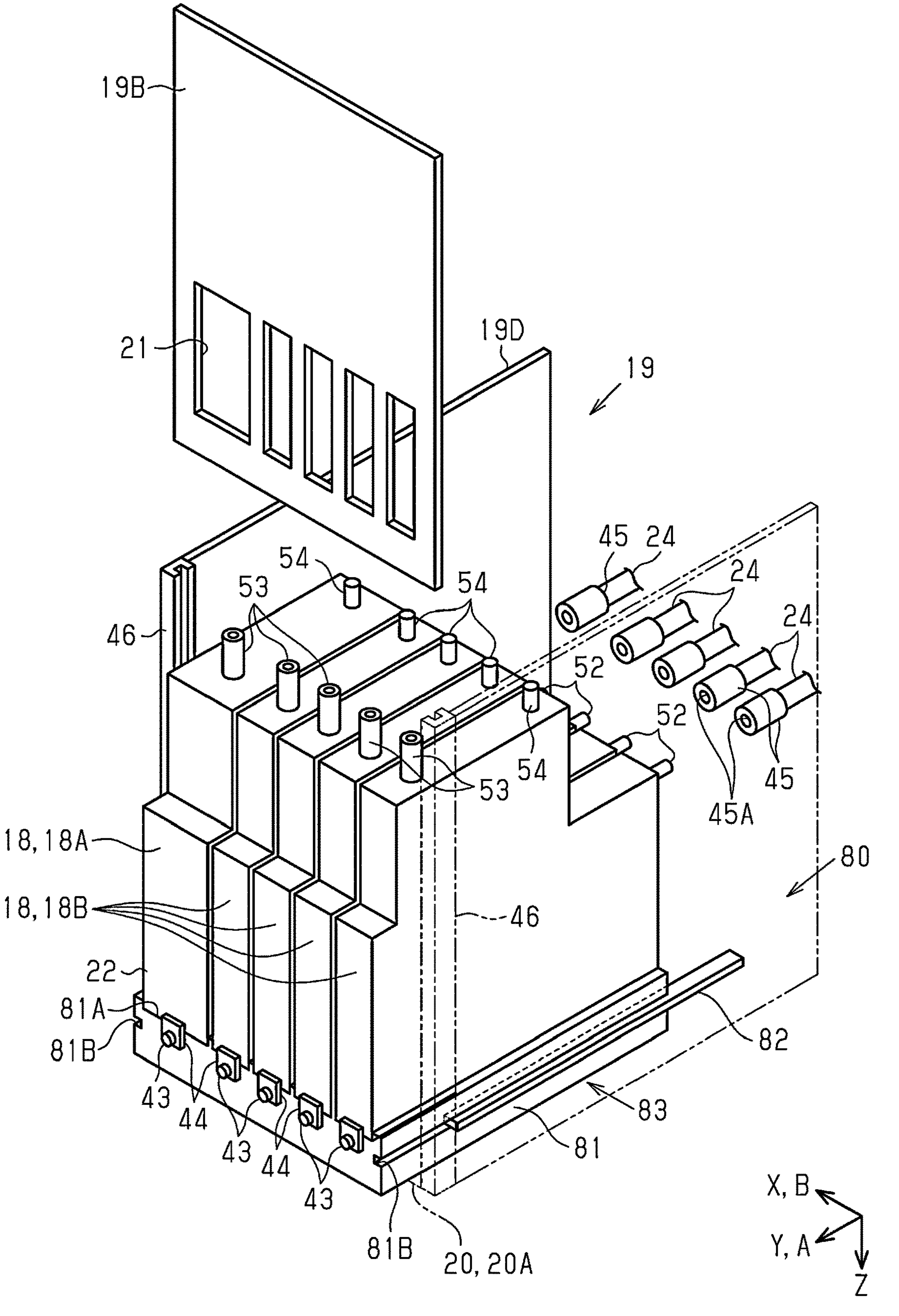
FIG. 13 is a schematic perspective view illustrating how a liquid container is taken out of a storage portion in a second embodiment.
Figure 14:
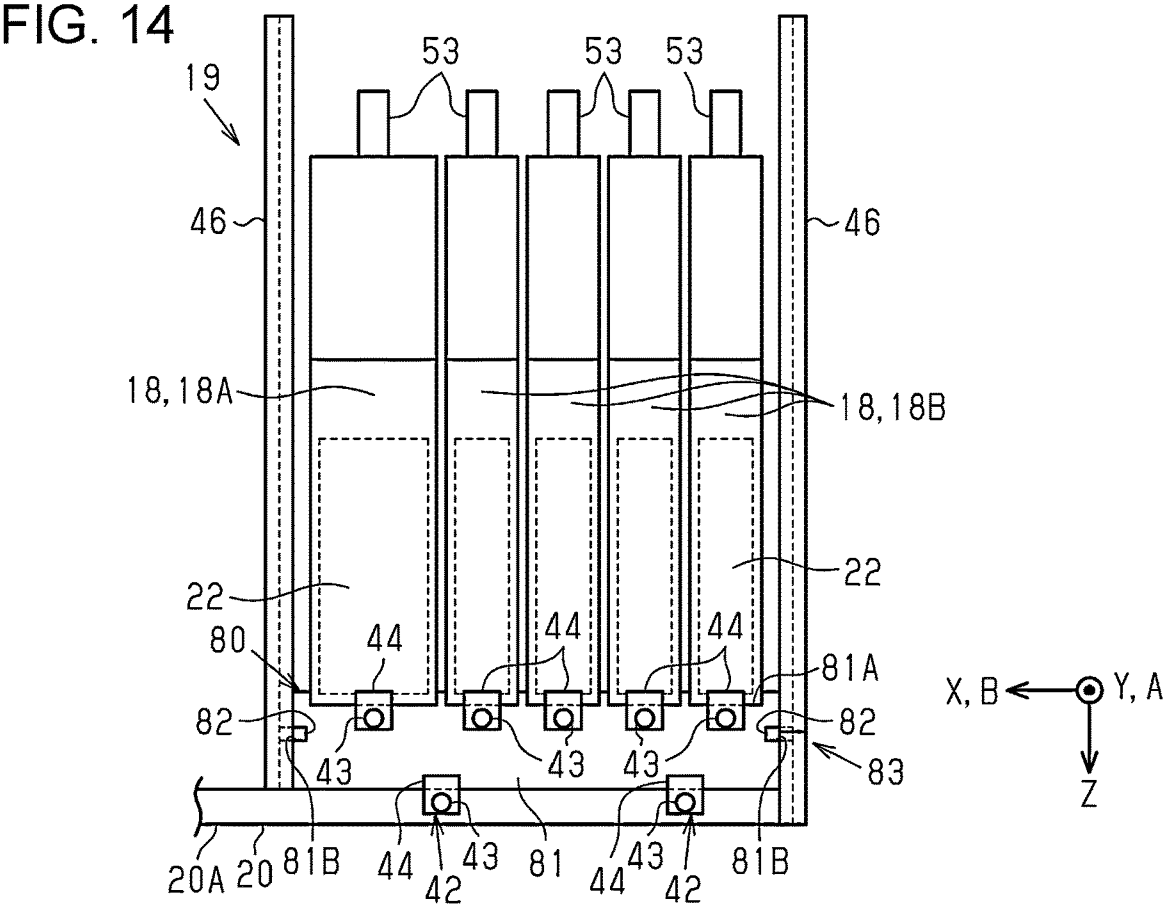
FIG. 14 is a schematic front view illustrating a storage portion accommodating a plurality of liquid containers.
Figure 15:
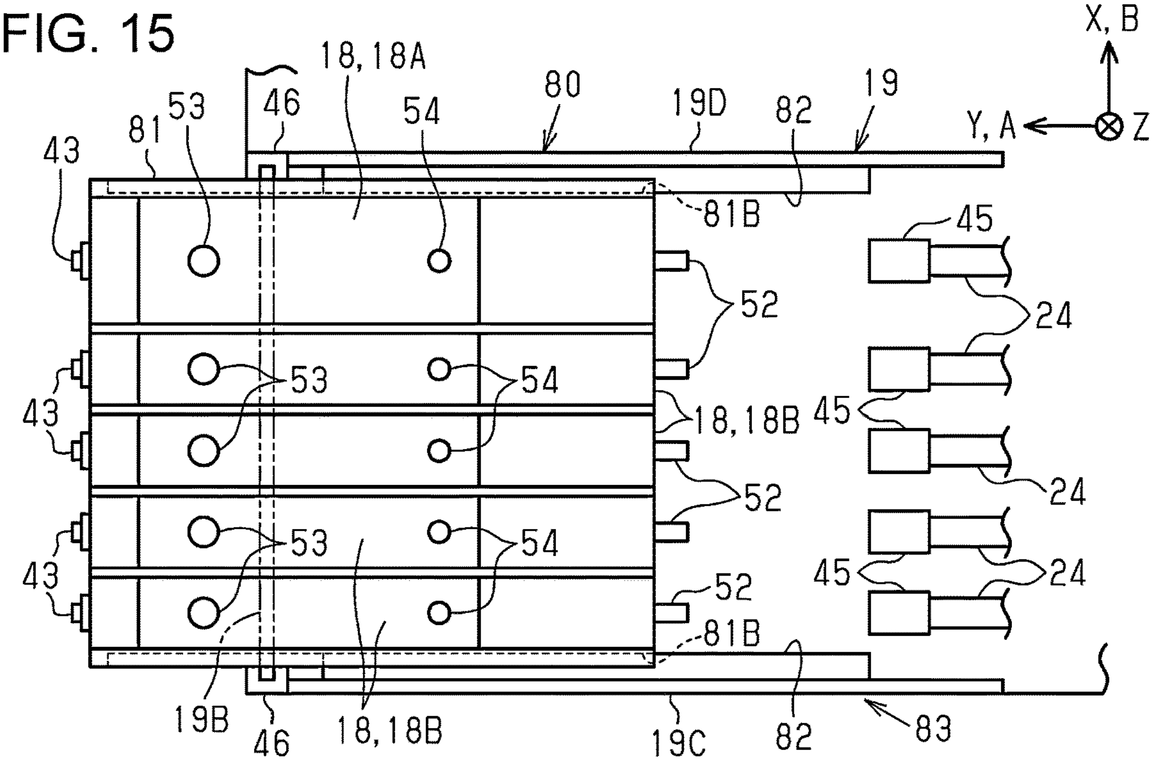
FIG. 15 is a schematic plan view illustrating how a liquid container is taken out of a storage portion.

FIG. 14 illustrates how the plurality of liquid containers 18 is fixed to the casing 20 with fixing portions 42, and FIGS. 13 and 15 illustrate how the plurality of liquid containers 18 is separated by a separating mechanism 80 of the present embodiment.

While the separating mechanism 47 of the first embodiment can separate a plurality of liquid containers 18 individually from the supply passage 24, as illustrated in FIGS. 13 and 15, the separating mechanism 80 of the second embodiment can separate a plurality of liquid containers 18 from a supply passage 24 collectively.

As illustrated in FIG. 14, the plurality of liquid containers 18 is fixed to the casing 20 with the fixing portions 42. Then, each of the plurality of liquid containers 18 has a liquid storage portion 51 capable of storing liquid, the liquid supply portion 52, and the liquid discharge portion 71 that discharges the liquid stored in the liquid storage portion 51 to the outside. The liquid supply portion 52 is a part to which one end portion of the supply passage 24 supplying liquid to the ejection head 25 is directly or indirectly coupled.

As illustrated in FIGS. 13 and 15, in a state where fixing by the fixing portions 42 is released, the separating mechanism 80 can separate the plurality of liquid containers 18 from the casing 20 collectively in a first direction A. The first direction A is a direction in which the liquid supply portion 52 can be separated from the one end portion of the supply passage 24.

As illustrated in FIGS. 13 to 15, the separating mechanism 80 includes a moving base 81 that can be moved in the first direction A with respect to a bottom portion 20A of the casing 20. An upper surface of the moving base 81 is a mounting surface 81A, and a plurality of (e.g., five) liquid containers 18 is mounted on the mounting surface 81A. The plurality of liquid containers 18 is fixed to the moving base 81 using screws 43 and restriction members 44.

As illustrated in FIG. 14, the moving base 81 is fixed to the bottom portion 20A of the casing 20 with the fixing portions 42. The fixing portions 42 include the screws 43 and the restriction members 44. The liquid containers 18 are positioned in the first direction A and a second direction B while being fitted into a plurality of recessed grooves recessed from the mounting surface 81A of the moving base 81 and abutting on a wall surface located at the back of the recessed grooves. Then, when the restriction members 44 restricting frontward movement are fixed to a front surface of the moving base 81 with the screws 43 from the front surface side, the liquid containers 18 are movable in the first direction A together with the moving base 81.

A pair of rails 46 similar to those of the first embodiment are provided in side plates 19C and 19D forming a storage portion 19, and a door body 19B can be attached and detached by moving it upward along the pair of rails 46.

A pair of rails 82 extending along the first direction are provided at a height position on the side plates 19C and 19D corresponding to the height where the moving base 81 is arranged. In the moving base 81, a pair of rail grooves 81B that can be engaged with the pair of rails 82 are recessed from a pair of side surfaces intersecting the second direction B. Hence, the moving base 81 can be moved in the first direction A in a state where fixing by the fixing portions 42 is released. Note that the rail grooves 81B and the rails 82 form a moving mechanism 83.

The storage portion 19 has the door body 19B. The door body 19B is movable between a shielding position covering the first direction A side of the plurality of liquid containers 18 and an open position not covering the first direction A side thereof with respect to the casing 20. The door body 19B has a window portion 21 that allows the user to view the remaining amount of liquid in the liquid container 18.

When the door body 19B is in the open position not covering the first direction A side of the plurality of liquid containers 18, the separating mechanism 47 pulls the liquid container 18 out of the storage portion 19. As a result, the liquid supply portion 52 of the liquid container 18 is separated from the one end portion of the supply passage 24.

As illustrated in FIG. 16, the liquid container 18 of the second embodiment includes a liquid supply portion 52 and a liquid discharge portion 71 separate from each other. That is, in this example, the liquid discharge portion 71 for discharging liquid in the liquid container 18 to the outside is provided separately from the liquid supply portion 52.

As illustrated in FIG. 16, the basic configuration of the liquid container 18 is the same as the first embodiment. That is, as the liquid container 18 of the first embodiment as illustrated in FIGS. 9 to 12, the liquid container 18 includes a liquid storage portion 51 capable of storing liquid and a liquid pouring portion 53 that pours liquid into the liquid storage portion 51. Furthermore, the liquid container 18 includes the liquid supply portion 52 that is a part to which one end portion of a supply passage 24 (see FIG. 24) supplying liquid to an ejection head 25 is coupled and that supplies liquid in the liquid storage portion 51, and the liquid discharge portion 71 that discharges the liquid stored in the liquid storage portion 51. The liquid supply portion 52 is located in an upper portion of a side surface 51B of the liquid container 18. The inside of a liquid compartment 55 of the liquid storage portion 51 is partitioned into a region storing liquid and a supply passage guiding liquid to the liquid supply portion 52 by a passage forming wall 51D extending downward from a partition wall portion 51C.

The liquid supply portion 52 is capable of connecting to a connection portion 45 provided in an upstream end portion of the supply passage 24. When the liquid supply portion 52 is connected (coupled) to the connection portion 45 (see FIG. 16), the liquid supply portion 52 is coupled to a coupling port 45A of the connection portion 45. The liquid discharge portion 71 is arranged in a bottom surface 51A or a lower portion of the side surface 51B of the liquid storage portion 51. Note that in the example illustrated in FIGS. 9 to 12, the liquid discharge portion 71 is arranged in the bottom surface 51A of the liquid storage portion 51. The liquid discharge portion 71 protrudes downward from the bottom surface 51A of the liquid storage portion 51.

The liquid container 18 also includes a first valve 59 capable of opening and closing a passage of the liquid supply portion 52. The liquid container 18 has a second valve 72 capable of opening and closing a passage of the liquid discharge portion 71. In the second embodiment, the liquid supply portion 52 and the liquid discharge portion 71 are provided separately, and therefore the first valve 59 and the second valve 72 are also provided separately. The valve structure and function of the first valve 59 and the valve structure and function of the second valve 72 are the same as the first embodiment.

That is, the first valve 59 has a valve body, a valve seat, and an energizing member (e.g., spring) that energizes the valve body in a direction of abutting on the valve seat. For example, when the connection portion 45 is coupled to the liquid supply portion 52, the valve body at the back of the liquid supply portion 52 is separated from the valve seat by a force received from the connection portion 45, whereby the first valve 59 is switched to the open-valve state from the closed-valve state. When the connection portion 45 is removed from the liquid supply portion 52, the valve body comes into contact with the valve seat by the energizing force of the energizing member, so that the first valve 59 is switched to the closed-valve state from the open-valve state.

The second valve 72 has a valve body, a valve seat, and an energizing member (e.g., spring) that energizes the valve body in a direction of abutting on the valve seat. For example, when a collection coupling portion 62 of the liquid collection container 60 described later is coupled to the liquid discharge portion 71, the valve body is retracted in a direction of separating from the valve seat by a force received from the collection coupling portion 62 (see FIG. 18), whereby the second valve 72 is switched to the open-valve state from the closed-valve state. Moreover, when the collection coupling portion 62 is removed from the liquid discharge portion 71, the valve body comes into contact with the valve seat by the energizing force of the energizing member, so that the second valve 72 is switched to the closed-valve state from the open-valve state.

Configuration of Liquid Ejecting System

Next, the liquid container 18 and the collection container 60 will be described with reference to FIGS. 18 to 21.

In the present embodiment, a liquid ejecting system is formed of the liquid ejecting apparatus 11 and the collection container 60. The liquid ejecting apparatus 11 and the collection container 60 may be sold as a set, or the user may obtain the collection container 60 for a fee or free of charge at the stage of disposal of the liquid ejecting apparatus 11. Alternatively, a recessed portion may be provided in a casing 20 of the liquid ejecting apparatus 11, and the collection container 60 may be inserted into the recessed portion. An opening of the recessed portion may be covered with a cover. The cover may be removed to take the collection container 60 out of the recessed portion for use when disposing of the liquid ejecting apparatus 11.

Figure 18:
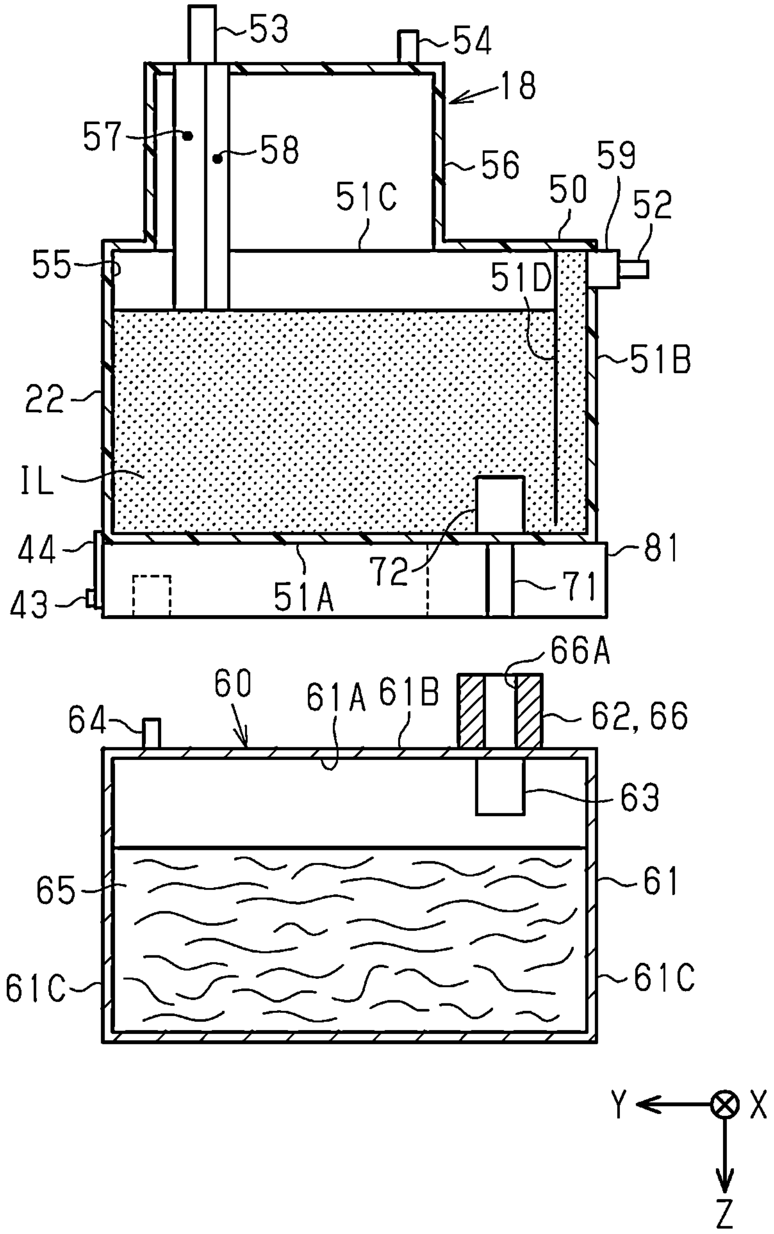
FIG. 18 is a schematic side cross-sectional view illustrating a liquid container and a collection container.
Figure 19:
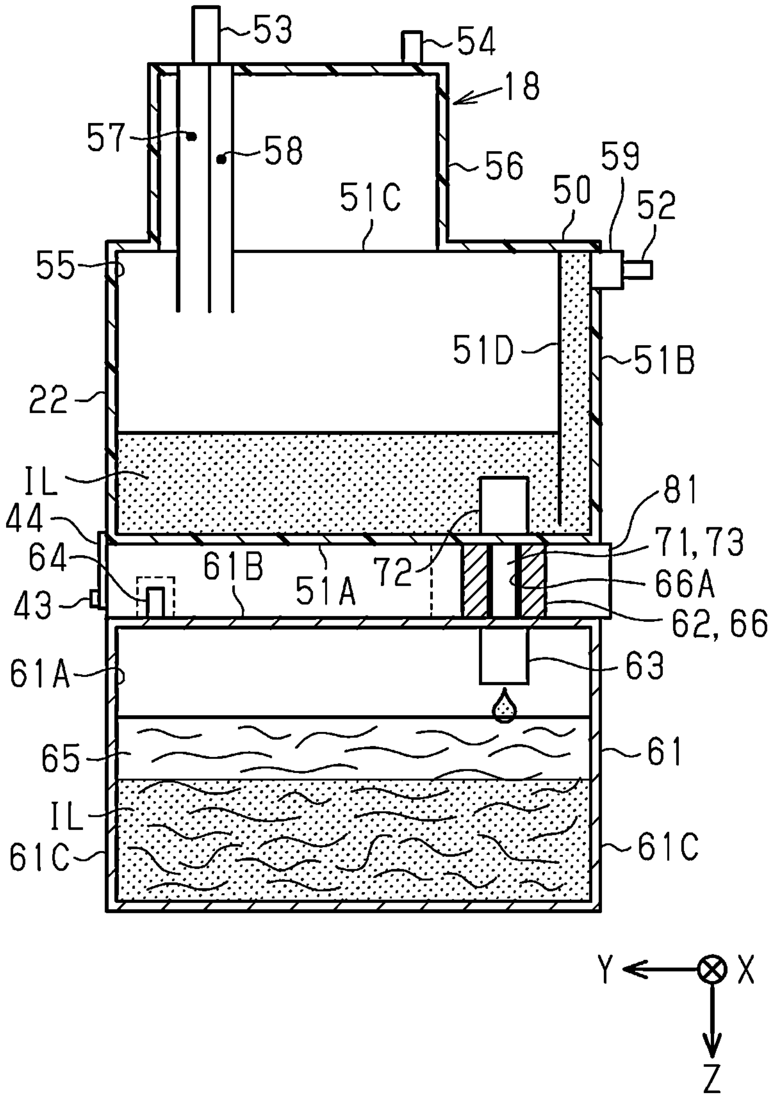
FIG. 19 is a schematic side cross-sectional view illustrating how liquid is collected into a collection container from a liquid container.

As illustrated in FIGS. 18 and 19, the collection container 60 includes a collection coupling portion 62 that can be coupled to the liquid discharge portion 71 of the liquid container 18, a collection container portion 61 capable of collecting liquid, and an atmospheric connection portion 64 that connects the inside of the collection container portion 61 to the atmosphere. As illustrated in FIG. 19, the liquid collected through the coupling between the liquid discharge portion 71 and the collection coupling portion 62 from the liquid container 18 is stored in the collection container portion 61.

Figure 20:
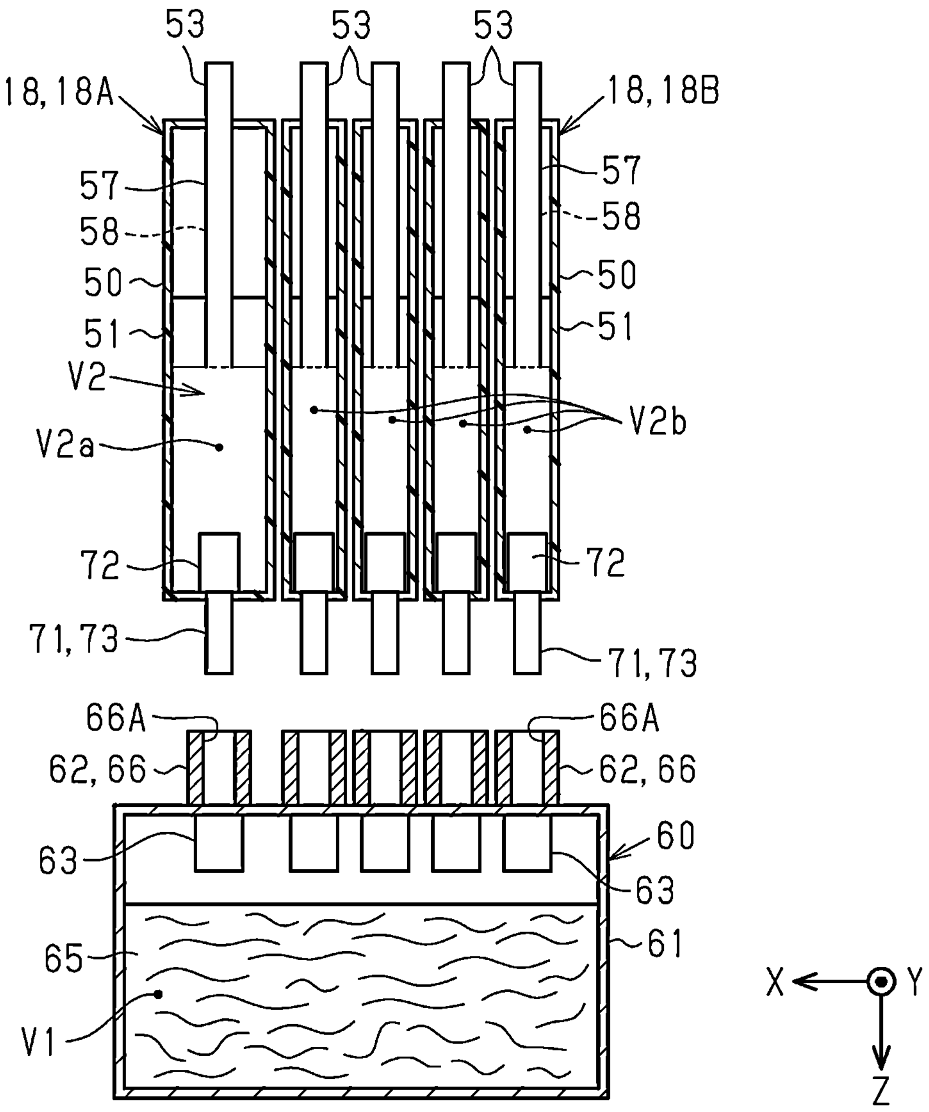
FIG. 20 is a schematic front cross-sectional view illustrating a liquid container and a collection container.

As illustrated in FIG. 20, in an upper portion of the collection container 60, the same number of collection coupling portions 62 as the number of liquid containers 18 in one liquid ejecting apparatus 11 are provided at intervals in the width direction X. These intervals correspond to the width dimensions of the plurality of liquid containers 18.

Hence, a plurality of liquid containers 18 can be coupled to the collection container 60 simultaneously. The atmospheric connection portion 64 protrudes upward from an upper surface of the collection container portion 61. The atmospheric connection portion 64 is connected to a collection compartment 61A. Note that if there is one collection compartment 61A in the collection container 60, the number of atmospheric connection portions 64 may be one or more.

Figure 21:
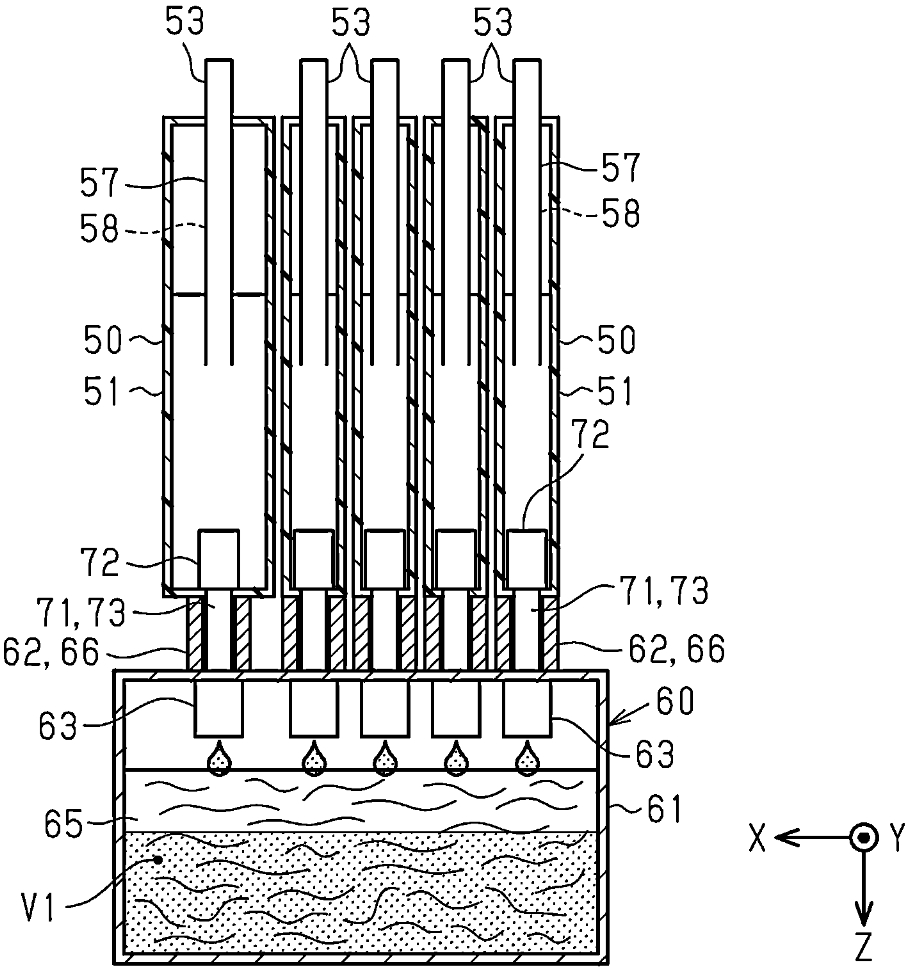
FIG. 21 is a schematic front cross-sectional view illustrating how liquid is collected into a collection container from a liquid container.

Of the plurality of liquid containers 18, the plurality of liquid containers 18 separated from the one end portion of the supply passage 24 is collectively coupled to the collection container 60 illustrated in FIG. 21. As illustrated in FIG. 21, the liquid discharge portion 71 of the liquid container 18 and the collection coupling portion 62 of the collection container 60 are coupled to each other. The liquid in the liquid container 18 can be collected in the collection container 60 by hydraulic head pressure.

As illustrated in FIGS. 18 to 21, the plurality of liquid containers 18 can be coupled to the collection container 60 together with the moving base 81. Although the liquid discharge portion 71 is located in the part of the moving base 81, the moving base 81 does not get in the way, and the liquid discharge portion 71 and the collection coupling portion 62 can be coupled to each other. Although the moving base 81 is interposed between the liquid container 18 and the collection container 60, the moving base 81 is set to a thickness that allows coupling of the liquid discharge portion 71 and the collection coupling portion 62. In other words, a coupling margin is set so that the liquid discharge portion 71 and the collection coupling portion 62 can be coupled to each other completely even if the moving base 81 of a predetermined thickness is interposed between the liquid container 18 and the collection container 60. Hence, it is possible to couple the plurality of liquid containers 18 to the collection container 60 collectively together with the moving base 81.

Moreover, as illustrated in FIG. 20, the collection container 60 is placed below the liquid container 18 removed from the casing 20. The collection coupling portion 62 has a cylindrical shape, and has, in the cylinder, a recessed portion 66A into which the liquid discharge portion 71 can be fitted. Then, as illustrated in FIGS. 19 and 21, the liquid discharge portion 71 of the liquid container 18 and the collection coupling portion 62 of the collection container 60 are coupled to each other. Then, both the second valve 72 and a third valve 63 are switched to the open-valve state from the closed-valve state. The liquid in the liquid container 18 is moved to the collection container 60 by hydraulic head pressure.

Here, as illustrated in FIG. 20, a capacity V1 of liquid storable by the liquid collection container 60 is larger than a total liquid capacity V2 which is the entire capacity of liquid storable in the liquid container 18. The capacity V1 of liquid collectable by the collection container 60 is set larger than the total liquid capacity V2 which is the sum of the amounts of liquid storable in the plurality of liquid containers 18. A capacity V2a of liquid storable in a first liquid container 18A and a capacity V2b of liquid storable in a second liquid container 18B are defined. The total liquid capacity V2 which is the sum of capacities of liquid storable in the plurality of liquid containers 18 is V2=V2a+4*V2b.

The capacity V1 of the collection container 60 is set to a larger value than the total liquid capacity V2. Note that although the liquid holding member 65 is enclosed in the collection container 60 in the example illustrated in FIG. 20 and other drawings, the liquid capacity of the collection container 60 excluding the volume of the liquid holding member 65 is set to the capacity V1 larger than the total liquid capacity V2.

Thus, the collection container 60 collects substantially the entire liquid in the liquid container 18 without spilling. The liquid collected in the collection container 60 is absorbed by the liquid holding member 65. Therefore, even if the collection container 60 is tilted, the liquid does not leak. Then, the user returns the empty liquid container 18 from which the residual liquid is discharged to the collection container 60 to the original storage portion 19. The user disposes of the liquid ejecting apparatus 11 with an empty liquid container 18 with no residual liquid left therein.

Effect of Second Embodiment

Next, effects of the liquid ejecting apparatus 11 including the liquid container 18 of the second embodiment will be described. Effects of a liquid ejecting system including the liquid ejecting apparatus 11 and the collection container 60 will also be described.

When disposing of the liquid ejecting apparatus 11, the user obtains the collection container 60. The collection container 60 is obtained in the same manner as in the first embodiment.

In the liquid ejecting apparatus 11 illustrated in FIG. 1, the user opens an image reading apparatus 13 and a cover 32 as illustrated in FIG. 2. Furthermore, the user slides the door body 19B forming the front surface portion of the storage portion 19 upward, for example, to remove it from the casing 20. When the door body 19B is removed, the front (+Y direction side) of the liquid container 18 in the storage portion 19 is opened.

Next, the fixing by the fixing portions 42 is released. To be specific, the restriction members 44 are removed by loosening the screws 43. As a result, the plurality of liquid containers 18 can be moved in the first direction A (+Y direction) together with the moving base 81. Furthermore, the plurality of liquid containers 18 is moved in the first direction A together with the moving base 81 to separate the plurality of liquid containers 18 from one end of the supply passage 24 collectively.

Figure 17:
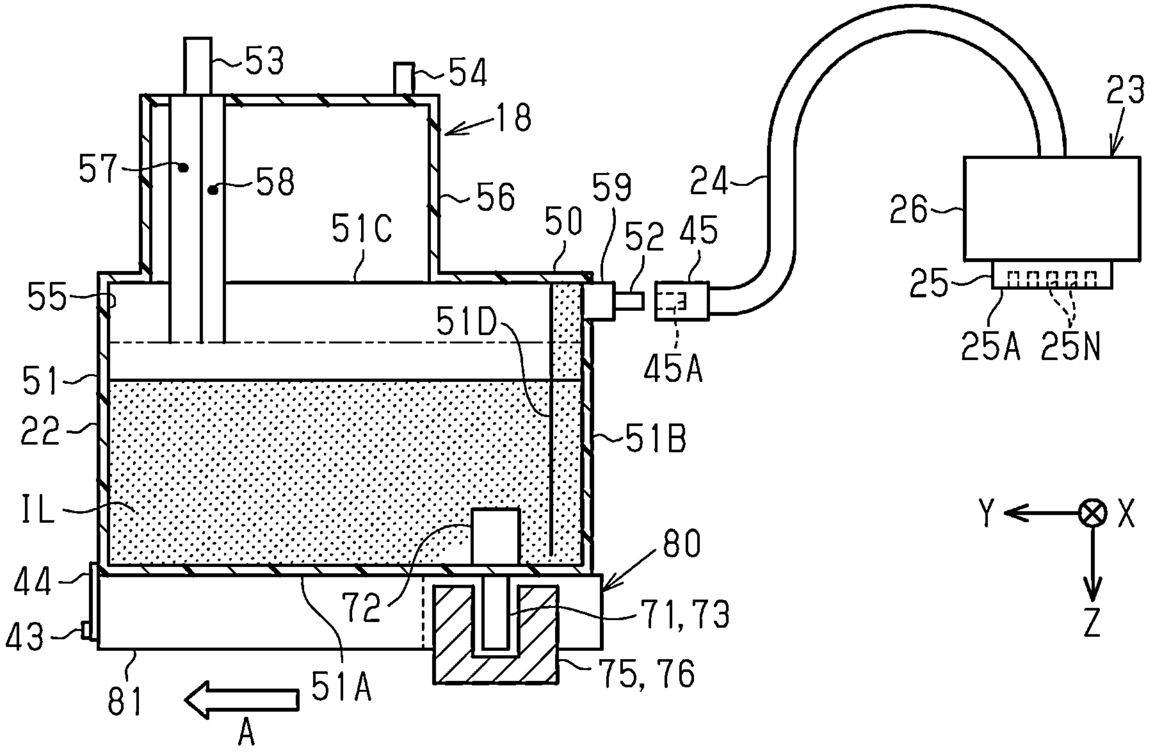
FIG. 17 is a schematic side cross-sectional view illustrating a process of disconnecting coupling with a supply passage by moving a liquid container.

Specifically, as illustrated in FIGS. 13, 15, and 17, the user moves the moving base 81 on which the plurality of liquid containers 18 is mounted in the first direction A by the moving mechanism 83. As a result, the user can remove the plurality of liquid containers 18 from the casing 20 collectively together with the moving base 81. At this time, in the process of moving the moving base 81 in the first direction A, the coupling between the liquid supply portion 52 and the connection portion 45 is disconnected for the number of liquid containers 18. Since a plurality of liquid containers 18 is moved collectively together with the moving base 81, the force required for moving is larger than in the first embodiment, but the load on one coupling between the liquid supply portion 52 and the connection portion 45 is the same. No excessive load is applied on a coupling portion or the like between the liquid supply portion 52 and the connection portion 45. Note that a work space may be provided for the user to disconnect the coupling between the liquid supply portion 52 and the connection portion 45 in advance, and the plurality of liquid containers 18 may be moved in the first direction A collectively together with the moving base 81 after the coupling between the liquid supply portion 52 and the connection portion 45 is disconnected.

When the connection portion 45 is removed from the liquid supply portion 52, the first valve 59 is switched to the closed-valve state from the open-valve state, whereby leakage of liquid such as ink from the liquid supply portion 52 is curbed. Therefore, staining of the inside of the casing 20 with liquid such as ink can be curbed as much as possible. Note that when the connection portion 45 is removed from the liquid supply portion 52, a valve (not illustrated) provided on the connection portion 45 side is switched to the closed-valve state from the open-valve state.

Next, as illustrated in FIGS. 18 and 20, the collection container 60 is placed below the liquid container 18 removed from the casing 20. The collection coupling portion 62 has a tube shape, and has, in the tube, the recessed portion 66A into which the liquid discharge portion 71 can be fitted. Then, as illustrated in FIGS. 19 and 21, the liquid discharge portion 71 of the liquid container 18 and the collection coupling portion 62 of the collection container 60 are coupled to each other. Then, both the second valve 72 and the third valve 63 are switched to the open-valve state from the closed-valve state. The liquid inside the liquid container 18 is moved to the collection container 60 by hydraulic head pressure. In this liquid collection process, an amount of air corresponding to the volume of the liquid that flowed into the collection container 60 from the liquid container 18 is discharged from the atmospheric connection portion 64. As a result, the liquid continuously flows into the collection container 60 from the liquid container 18.

Here, the capacity V1 of liquid storable by the collection container 60 is set larger than the total liquid capacity V2 of liquid storable by the plurality of liquid containers 18. Substantially the entire liquid in the liquid container 18 is collected in the collection container 60 without spilling. The liquid collected in the collection container 60 is absorbed by the liquid holding member 65. Therefore, even if the collection container 60 is tilted, the liquid does not leak. Then, the user returns the empty liquid container 18 from which residual liquid is discharged to the collection container 60 to the original storage portion 19. The user disposes of the liquid ejecting apparatus 11 with a substantially empty liquid container 18 with no residual liquid left therein.

Therefore, according to the second embodiment, the effects of (1-2) to (1-4) of the first embodiment can be obtained in the same manner, and the following effects can also be obtained.

(2-1) The liquid ejecting apparatus 11 includes the ejection head 25 that ejects liquid, the plurality of liquid containers 18 capable of storing liquid supplied to the ejection head 25, and the casing 20 that accommodates the ejection head 25 and the plurality of liquid containers 18. The liquid ejecting apparatus 11 also includes the fixing portion 42 that fixes the plurality of liquid containers 18 to the casing 20. Each of the plurality of liquid container 18 has the liquid storage portion 51 capable of storing liquid, the liquid supply portion 52, and the liquid discharge portion 71. The liquid supply portion 52 is a part to which one end portion of the supply passage 24 supplying liquid to the ejection head 25 is directly or indirectly coupled. The liquid discharge portion 71 is a part that discharges the liquid stored in the liquid storage portion 51 to the outside. The liquid ejecting apparatus 11 includes the separating mechanism 80. In a state where fixing by the fixing portion 42 is released, the separating mechanism 80 can separate the plurality of liquid containers 18 from the casing 20 collectively in the first direction A which is a direction in which the liquid supply portion 52 can be separated from one end portion of the supply passage 24. According to this configuration, it is possible to separate the plurality of liquid containers 18 collectively from the one end portion of the supply passage 24 and from the casing 20. Since the plurality of liquid containers 18 can be separated collectively, less work is required as compared to when the liquid containers 18 are separated individually.

(2-2) When the door body 19B is in the open position not covering the front surface of the plurality of liquid containers 18, the liquid containers 18 are pulled out of the storage portion 19 by the separating mechanism 80 to be separated from the one end portion of the supply passage 24. According to this configuration, even when the liquid containers 18 are accommodated in the storage portion 19, it is possible to move the liquid containers 18 in the first direction A and disconnect the coupling between the liquid supply portion 52 and the one end portion of the supply passage 24 when the door body 19B is in the open position.

(2-3) The liquid ejecting system includes the liquid ejecting apparatus 11 and the liquid collection container 60. The liquid discharge portion 71 of at least one liquid container 18 separated from one end portion of the supply passage 24 among the plurality of liquid containers 18 is coupled to the collection coupling portion 62. In particular, in the second embodiment, it is possible to couple the liquid containers 18 to the collection container 60 collectively. The liquid in the liquid container 18 can be collected in the liquid collection container 60 by hydraulic head pressure. According to this configuration, it is possible to collect residual liquid in the liquid container 18 into the collection container relatively easily when disposing of the liquid ejecting apparatus 11.

Note that the above embodiments can also be modified into modes such as the modifications described below. Furthermore, the above embodiment and the following modification may be appropriately combined to obtain a different modification, or the following modifications may be appropriately combined to obtain a different modification.

Figure 22:
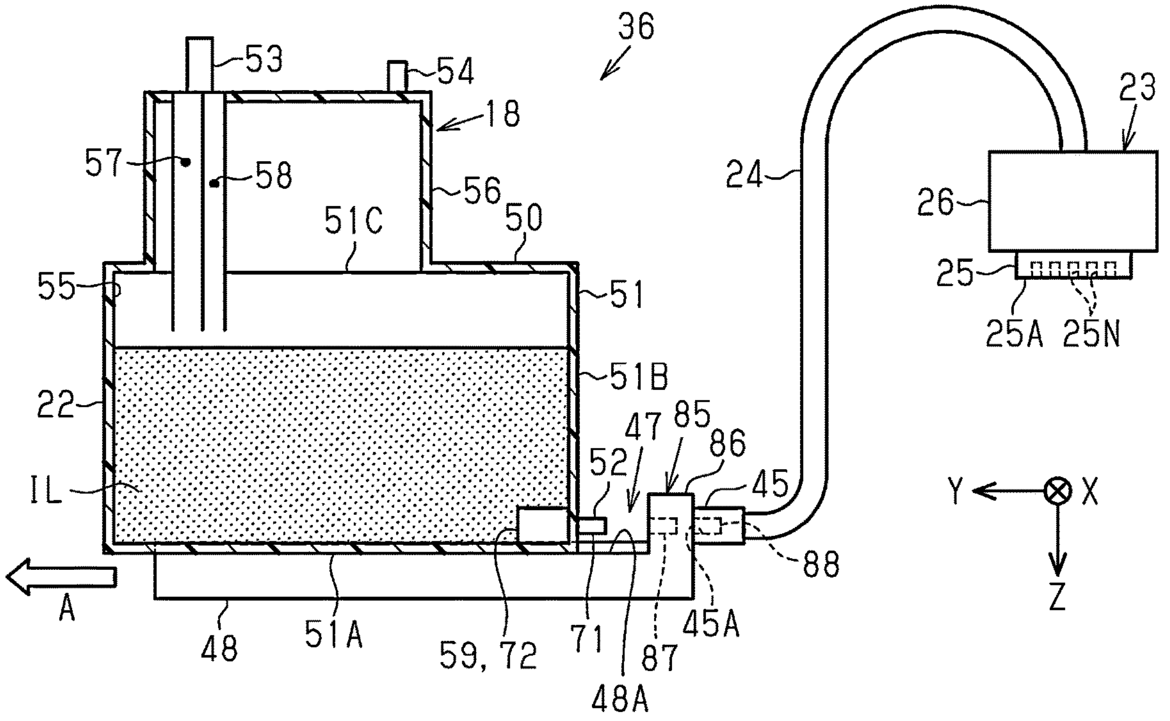
FIG. 22 is a partially cut schematic view illustrating how a liquid container is separated in a configuration including a holder of a modification.

In the first embodiment, the liquid supply portion 52 may be a part to which one end portion of the supply passage 24 supplying liquid to the ejection head 25 is directly or indirectly coupled. For example, as illustrated in FIG. 22, the configuration may include a holder 85 to which a plurality of liquid containers 18 can be attached. In this case, the mounting portion 48 may also serve as a part of the holder 85. For example, the holder 85 has the mounting portion 48 and an upward-extending back portion 86 in a rear portion of the mounting portion 48. The separating mechanism 47 has the holder 85 that holds the plurality of liquid storage portions 51 side by side in the second direction B intersecting the first direction A, and the guide portion 48A that guides the plurality of liquid containers 18 so as to be movable in the first direction A with respect to the holder 85. The holder 85 has, on both surfaces of the back portion 86, for example, a first coupled portion 87 to which the liquid supply portion 52 is coupled, and a second coupled portion 88 to which the connection portion 45 provided on one end of the supply passage 24 can be coupled. The holder 85 incorporates a passage that connects the first coupled portion 87 to the second coupled portion 88. When the liquid supply portion 52 of the liquid container 18 is coupled to the first coupled portion 87 of the holder 85 and the connection portion 45 of the supply passage 24 is coupled to the second coupled portion 88, the liquid supply portion 52 is coupled indirectly to the one end of the supply passage 24 via the holder 85. Then, as illustrated in FIG. 22, in a state where fixing of the liquid containers 18 to the casing 20 (e.g., bottom portion 20A) by the fixing portions 42 (FIG. 4 and other drawings) is released, the separating mechanism 47 can separate the liquid containers 18 from the casing 20 individually in the first direction A which is the separating direction. By moving the liquid container 18 in the first direction A which is the separable direction by the separating mechanism 47, the liquid supply portion 52 is separated indirectly from the one end portion of the supply passage 24. Thus, the liquid supply portion 52 of the liquid container 18 may be separated indirectly from the connection portion 45 coupled to the holder 85 by separating the liquid container 18 from the holder 85.

As described above, the separating mechanism 47 illustrated in FIG. 22 has the holder 85 that holds the plurality of liquid storage portions 51 side by side in the second direction B intersecting the first direction A, and the guide portion 48A that guides the plurality of liquid containers 18 so as to be movable in the first direction A with respect to the holder 85. The liquid supply portion 52 of the liquid container 18 is indirectly coupled to the one end portion of the supply passage 24 via the holder 85. According to this configuration, it is possible to separate the liquid containers 18 with residual liquid individually from the holder 85. For example, it is possible to selectively separate the liquid container 18 from which liquid needs to be discharged from the supply passage 24. As a result, the liquid in the liquid container 18 is discharged more easily.

Figure 23:
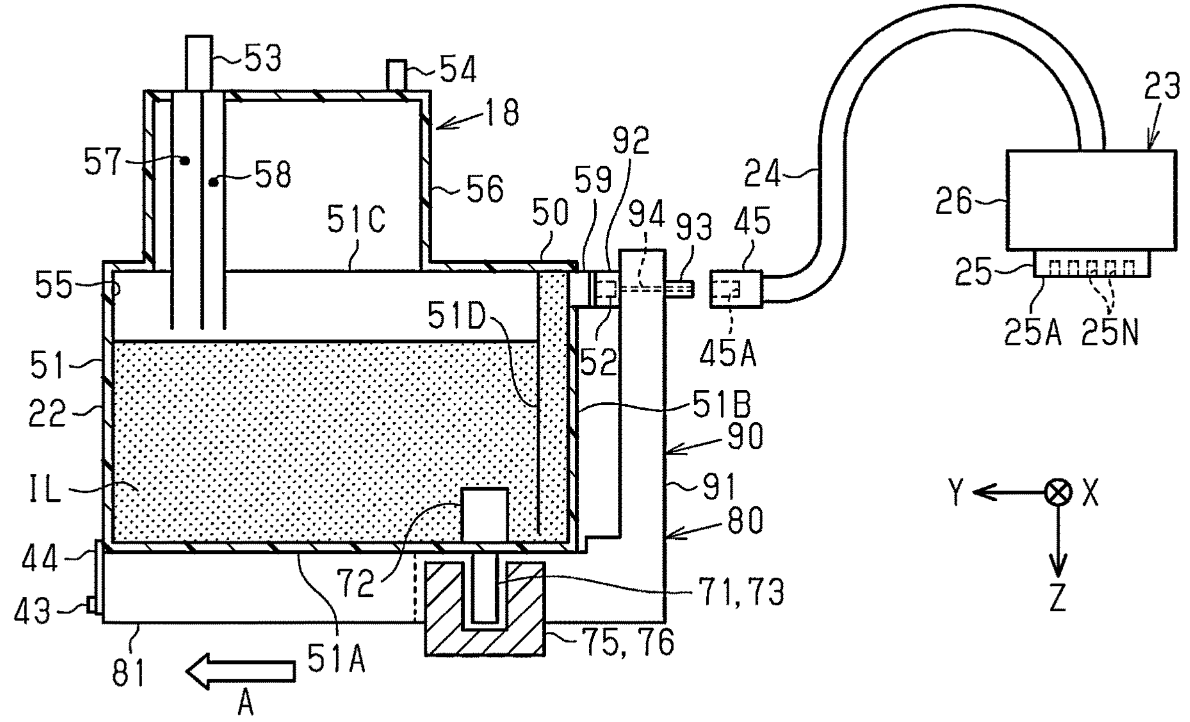
FIG. 23 is a partially cut schematic view illustrating how a liquid container is separated in a configuration including a holder of a modification different from FIG. 22.

In the second embodiment, the liquid supply portion 52 may be a part to which one end portion of the supply passage 24 supplying liquid to the ejection head 25 is coupled indirectly. For example, as illustrated in FIG. 23, the configuration may include a holder 90 to which a plurality of liquid containers 18 can be attached. That is, as illustrated in FIG. 23, the separating mechanism 80 includes the holder 90 that holds the plurality of liquid storage portions 51 side by side in the second direction B intersecting the first direction A, and the moving mechanism 83 capable of moving the holder 90 in the first direction A. In this case, the moving base 81 may also serve as a part of the holder 90. For example, the holder 90 has the moving base 81 and an upward-extending back portion 91 in a rear portion of the moving base 81. The holder 90 has, on both surfaces of the back portion 91, for example, a first coupled portion 92 to which the liquid supply portion 52 is coupled, and a second coupled portion 93 to which the connection portion 45 provided on one end of the supply passage 24 can be coupled. The holder 90 incorporates a passage 94 that connects the first coupled portion 92 to the second coupled portion 93. When the liquid supply portion 52 of the liquid container 18 is coupled to the first coupled portion 92 of the holder 90 and the connection portion 45 of the supply passage 24 is coupled to the second coupled portion 93, the liquid supply portion 52 is coupled indirectly to the one end of the supply passage 24 via the holder 90. Then, as illustrated in FIG. 23, in a state where fixing of the liquid containers 18 to the casing 20 (e.g., bottom portion 20A) by the fixing portions 42 (FIG. 14 and other drawings) is released, the separating mechanism 80 can separate the liquid containers 18 from the casing 20 collectively in the first direction A which is the separating direction. By moving the liquid container 18 in the first direction A which is the separable direction by the separating mechanism 80, the liquid supply portion 52 is separated indirectly from the one end portion of the supply passage 24. Thus, the liquid supply portion 52 of the liquid container 18 may be separated indirectly from the connection portion 45 coupled to the holder 90 by separating the liquid container 18 from the holder 90.

As described above, the separating mechanism 80 illustrated in FIG. 23 has the holder 90 that holds the plurality of liquid storage portions 51 side by side in the second direction B intersecting the first direction A, and moving mechanism 83 capable of moving the holder 90 in the first direction A. The liquid supply portion 52 of the liquid container 18 is indirectly coupled to the one end portion of the supply passage 24 via the holder 90. According to this configuration, it is possible to separate a plurality of liquid containers 18 collectively together with the holder 90 from the casing 20 to indirectly separate the plurality of liquid supply portions 52 collectively from the one end portion of the supply passage 24. Therefore, less work is required as compared to when the liquid containers 18 are separated individually.

Figure 24:
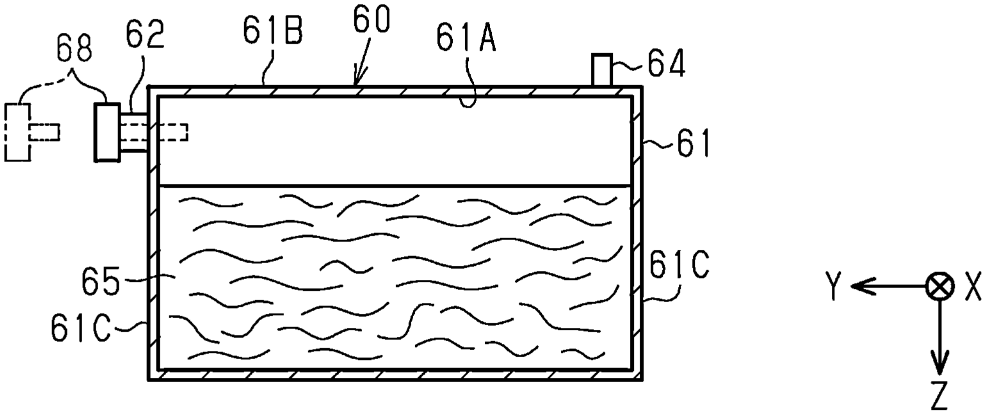
FIG. 24 is a schematic side cross-sectional view illustrating a collection container including a sealing member of a modification.
Figure 25:
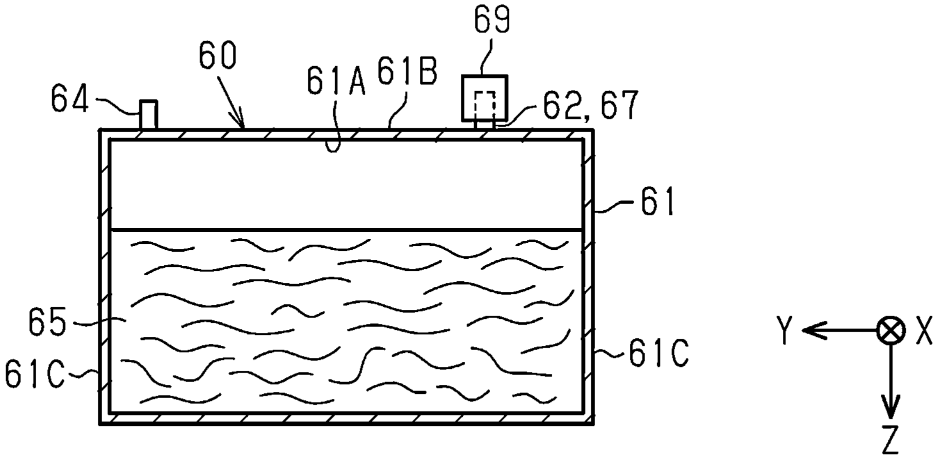
FIG. 25 is a schematic side cross-sectional view illustrating a collection container including a sealing member of a modification different from FIG. 24.

The collection container 60 may include a sealing member attached in a detachable manner to the collection coupling portion 62. For example, as illustrated in FIG. 24, the collection container 60 of the first embodiment may include an attachable and detachable sealing member 68 in the collection coupling portion 62. The collection coupling portion 62 may be provided with the sealing member 68 that seals the collection coupling portion 62 to prevent leakage of liquid in the collection container portion 61. In the example illustrated in FIG. 24, the sealing member 68 is a cap member that seals a coupling port of the collection coupling portion 62. The sealing member 68 formed of the cap member is attached so as to seal the coupling port by being fitted or screwed into the collection coupling portion 62. When collecting liquid, the user removes the sealing member 68 from the collection coupling portion 62 and couples the liquid discharge portion 71 of the liquid container 18 to the collection coupling portion 62. When collection of liquid ends, the coupling between the liquid container 18 and the collection container 60 is released, and the sealing member 68 is attached to the collection coupling portion 62. According to this configuration, since the collection coupling portion 62 is sealed with the sealing member 68 after collecting the liquid in the collection container 60, it is possible to curb leakage of liquid in the collection container 60. Alternatively, the collection container 60 of the second embodiment may include a sealing member 69 that can be attached and detached to and from the collection coupling portion 62 as illustrated in FIG. 25. With this configuration, too, the sealing member 69 can curb leakage of liquid in the collection container 60.

The moving direction of the door body 19B can be set in any way as long as liquid container 18 can be taken out in the first direction A. For example, the sliding direction may be the width direction X. The door body 19B is not limited to the sliding type as long as the liquid container 18 can be taken out in the first direction A, and the door body 19B can also be a rotary type. For example, the door body 19B may be configured to rotate about the bottom end, rotate about the right end, rotate about the left end, or rotate about the top end.

The moving direction when removing the liquid container 18 from the liquid ejecting apparatus 11 is not limited to the first direction A, and may be another direction. For example, the moving direction may be the Z direction (lower direction). In the casing 20, an opening is provided in a bottom surface below the arrangement position of the liquid container 18, and a cover is provided so as to open and close the opening. The liquid supply portion 52 protrudes upward from the liquid container 18. The coupling direction of the liquid supply portion 52 and the supply passage 24 is the Z direction. By moving the liquid container 18 in the Z direction along the rail, the liquid supply portion 52 and the supply passage 24 are disconnected and the liquid container 18 is removed from the bottom portion of the casing. Thus, the first direction may be the lower direction. In this case, the liquid container 18 may be movable individually in the first direction as in the first embodiment, or a plurality of liquid containers 18 may be movable collectively in the lower direction as in the second embodiment. Note that the first direction may be the right direction (−X direction), the left direction (+X direction), or the rear direction (−Y direction). For example, in FIG. 1 or other drawings, a right side portion of the storage portion 19 may be formed as a door body, and the liquid container 18 in the storage portion 19 may be taken out in the right direction from an opening opened by the door body. In this case, the window portion 21 may be provided in the door body, or may similarly be provided on the front surface of the storage portion 19. Alternatively, when the storage portion 19 is arranged on the front left side of the casing 20, the first direction may be the left direction. Furthermore, when two storage portions 19 are arranged on the left and right at the front of the casing 20, the first direction may be the outward direction in the width direction X of each storage portion 19. Moreover, the first direction may also be a direction with components in each of the two directions of X and Y, or in each of the two directions of Y and Z, or in each of the two directions of X and Z, and so on. Furthermore, the first direction may be a direction with components in each of the three directions of X, Y, and Z.

The first direction is not limited to the direction parallel to the transport direction Y, and may be the width direction X, or may be the lower direction or upper direction. In short, the first direction may be any direction as long as it is along the coupling direction of the liquid supply portion 52 and the supply passage 24. When the first direction is the width direction X, the door body 19B may be provided on the right side surface or left side surface of the casing 20, the door body 19B may be opened by sliding or rotating, and the liquid container 18 may be separated from one end of the supply passage 24 by moving the liquid container 18 in the first direction A which is the width direction X. Alternatively, the door body 19B may be provided on the back surface of the casing 20, the door body 19B may be opened by sliding or rotating, and the liquid container 18 may be separated from one end of the supply passage 24 by moving the liquid container 18 in the first direction A which is the depth direction-Y. Furthermore, when the cover 32 is the door body and the cover 32 is opened, the liquid container 18 may be separated from one end of the supply passage 24 by moving the liquid container 18 in the first direction A which is the upper direction-Z. Moreover, the door body may be provided in the bottom portion of the casing 20, the door body may be opened by sliding or rotating, and the liquid container 18 may be separated from one end of the supply passage 24 by moving the liquid container 18 in the first direction A which is the vertical direction Z. Note that the door body 19B is not limited to the sliding type or rotary type, and may be attachable and detachable to and from the casing 20.

The position of the liquid discharge portion 71 in the liquid storage portion 51 and the position of the collection coupling portion 62 in the collection container portion 61 may be changed as needed, as long as the liquid can be discharged by hydraulic head pressure.

In the first embodiment, the first valve 59 of the liquid supply portion 52 may be a manual opening and closing valve that can be manually opened and closed by operating an operation portion, or may be an opening and closing valve also having a manual opening and closing function. In this case, while the liquid supply portion 52 can be coupled to the collection coupling portion 62 to collect the liquid in the liquid container 18 into the collection container 60, the liquid may be collected in another container such as an empty bottle. In the latter case, since the first valve 59 can be kept in the closed-valve state by manual operation when collecting the liquid in the other container, leakage from the liquid supply portion 52 can be curbed even when the liquid container 18 is separated from the supply passage 24.

In the second embodiment, the second valve 72 of the liquid discharge portion 71 may be a manual opening and closing valve that can be manually opened and closed by operating an operation portion, or may be an opening and closing valve also having a manual opening and closing function. In this case, too, the liquid can be collected in another container such as an empty bottle if the second valve 72 can be opened and closed by a manual operation. That is, since the second valve 72 can normally be kept in the closed-valve state liquid leakage from the liquid discharge portion 71 can be curbed. On the other hand, by opening the second valve 72 by a manual operation when collecting liquid in another container, the liquid in the liquid container 18 can be collected into the other container from the liquid discharge portion 71.

The plurality of liquid containers 18 of the second embodiment may be individually separable from one end of the supply passage 24 in the first direction A by the separating mechanism 47 of the first embodiment. In this case, the liquid container 18 with the liquid discharge portion 71 arranged in the bottom surface or the lower portion of the side surface of the liquid storage portion 51 is movable in the first direction A along the guide portion 48A of the mounting portion 48.

The plurality of liquid containers 18 of the first embodiment may be collectively separable from one end of the supply passage 24 in the first direction A by the separating mechanism 80 of the second embodiment. In this case, the liquid container 18 with the liquid supply portion 52 also serving as the liquid discharge portion 71 arranged in the lower portion of the side surface of the liquid storage portion 51 is movable in the first direction A together with the moving base 81 while being fixed on the moving base 81.

While the storage portion 19 is arranged in a position close to the front right end of the casing 20 in the embodiments, it may be arranged in a position close to a front left end of the casing 20. Two storage portions 19 may be arranged on both left and right sides at the front of the casing 20. For example, the two storage portions 19 may be arranged on both sides of the operation panel 17 in the width direction X. In this case, one storage portion 19 may accommodate a black liquid container 18, and the other storage portion 19 may accommodate a plurality of liquid containers 18 storing colored liquids. In this case, the colors of the liquid in the plurality of liquid containers 18 may be a plurality of colors including cyan, magenta, and yellow. In this case, the separating mechanism may be the separating mechanism 47 capable of moving the liquid containers 18 individually in the first direction A with respect to the mounting portion 48, or may be the separating mechanism 80 capable of moving the plurality of liquid containers 18 collectively together with the moving base 81 in the first direction A.

The plurality of liquid containers 18 included in the liquid ejecting apparatus 11 may be two liquid containers 18. For example, the liquid ejecting apparatus 11 may be a monochrome print-only printer with two liquid containers 18 storing black ink as the liquid.

The liquid holding member 65 is not limited to a nonwoven fabric, a sponge, or a porous material, and may also be super absorbent polymer (SAP).

In the above embodiments, liquid is collected in the collection container 60 by connecting the liquid discharge portion 71 to the collection container portion 61. However, the liquid in the liquid container 18 may be poured from the liquid discharge portion 71 into the filler port of the collection container 60. For example, the opening of the collection container portion 61 may be formed larger than the opening of the liquid discharge portion 71, and liquid may be poured by hydraulic head pressure from a position where the openings are separated from each other.

The liquid is not limited to being collected in a collection container, and may be collected in a vinyl bag containing an absorbing material such as non-woven fabric. In this case, a collection container need not be prepared. Moreover, when collecting the liquid in the liquid container 18, it can be collected outside the container by hydraulic head pressure. Therefore, compared to when liquid is collected by tilting the liquid supply unit, for example, it is less likely to stain the liquid ejecting apparatus 11 or the surrounding area where the collection work is done by liquid such as ink.

In the liquid ejecting apparatus 11, the position of the liquid container 18 is not limited to the front right side of the casing 20, and may be on the front left side of the casing 20, for example. The position of the liquid container 18 may also be at the side of the casing 20 or at the rear of the casing 20. In the above embodiment, the liquid container 18 was positioned at a location where the casing 20 partially protrudes outward (e.g., to the front), but it may be positioned at a location where the casing 20 does not protrude outward.

The liquid ejecting apparatus 11 is not limited to an ink jet printer that prints on paper, but may be a textile printing device. The medium M is not limited to paper or fabric, but can be a synthetic resin film or a fabric such as cloth or non-woven fabric. In addition, the medium M can be a laminated medium containing a synthetic resin layer and a metal layer, a foil made of metal, or the like.

The liquid ejecting apparatus 11 may be a liquid ejecting apparatus that ejects liquids other than ink. The state of liquid ejected as minute droplets from the liquid ejecting apparatus includes granular, teardrop-shaped, and with thread-like tails. The liquid here is any material that can be ejected from the liquid ejecting apparatus. For example, a liquid may be in the state of a substance when it is in the liquid phase, and includes fluids such as high or low viscosity liquids, sols, gel waters, other inorganic solvents, organic solvents, solutions, liquid resins, and liquid metals (metal melts). Liquid includes not only liquid as a state of matter, but also particles of functional materials formed of solids such as pigments and metal particles dissolved, dispersed, or mixed in a solvent. Typical examples of liquids include inks and liquid crystals as described in the above embodiments. Here, ink includes general water-based and oil-based inks and various liquid compositions such as gel ink, hot-melt ink, and the like. Specific examples of the liquid ejecting apparatus include devices that eject liquids containing materials such as electrode materials and color materials in dispersion or dissolution for use in the manufacture of liquid crystal displays, electroluminescent (EL) displays, surface emitting displays, color filters, and the like. The liquid ejecting apparatus can be a device for ejecting bioorganic material used in biochip production, a device used as a precision pipette to eject liquid as a sample, a textile dyeing device, a micro dispenser, and the like. The liquid ejecting apparatus may be a device that ejects lubricant with pinpoint accuracy into precision machinery such as watches and cameras, or a device that ejects transparent resin liquid such as UV-cured resin onto a substrate to form micro hemispherical lenses (optical lenses) used for optical communication elements and other applications. The liquid ejecting apparatus may be a device that ejects an etching solution such as acid or alkali to etch substrates or the like.

Hereinafter, technical ideas understood from the above embodiments and modifications will be described together with their effects.

(A) A liquid ejecting apparatus includes: an ejection head ejecting liquid; a plurality of liquid containers configured to store liquid supplied to the ejection head; a casing accommodating the ejection head and the plurality of liquid containers; and a fixing portion fixing the plurality of liquid containers to the casing, in which each of the plurality of liquid containers includes a liquid storage portion configured to store liquid, a liquid supply portion that is a part to which one end portion of a supply passage supplying liquid to the ejection head is directly or indirectly coupled, and a liquid discharge portion discharging liquid stored in the liquid storage portion to the outside; and the liquid ejecting apparatus further includes a separating mechanism configured to, in a state where fixing by the fixing portion of the liquid container to the casing is released, separate the liquid container individually from the casing in a first direction which is a direction of separating the liquid supply portion from the one end portion of the supply passage.

According to this configuration, it is possible to separate the liquid container with residual liquid individually from one end portion of the supply passage. That is, it is possible to selectively separate the liquid container from which liquid needs to be discharged from the supply passage.

(B) A liquid ejecting apparatus includes: an ejection head ejecting liquid; a plurality of liquid containers configured to store liquid supplied to the ejection head; a casing accommodating the ejection head and the plurality of liquid containers; and a fixing portion fixing the plurality of liquid containers to the casing, in which each of the plurality of liquid containers includes a liquid storage portion configured to store liquid, a liquid supply portion that is a part to which one end portion of a supply passage supplying liquid to the ejection head is directly or indirectly coupled, and a liquid discharge portion discharging liquid stored in the liquid storage portion to the outside; and the liquid ejecting apparatus further comprises a separating mechanism configured to, in a state where fixing by the fixing portion is released, separate the plurality of liquid containers collectively from the casing in a first direction which is a direction of separating the liquid supply portion from the one end portion of the supply passage.

According to this configuration, a plurality of liquid containers can be collectively disconnected from one end portion of the supply passage and separated from the casing. Since the plurality of liquid containers can be separated collectively, less work is required as compared to when the liquid containers are separated individually.

(C) In the liquid ejecting apparatus according to described above (A), the separating mechanism may include a holder holding the plurality of liquid storage portions side by side in a second direction intersecting the first direction, and a guide portion guiding the plurality of liquid containers so as to be movable in the first direction with respect to the holder; and the liquid supply portion of the liquid container may be coupled to the one end portion of the supply passage indirectly via the holder.

According to this configuration, it is possible to separate the liquid container with residual liquid individually from the holder. For example, it is possible to selectively separate the liquid container from which liquid needs to be discharged from the supply passage. As a result, the liquid in the liquid container is discharged more easily.

(D) In the liquid ejecting apparatus according to described above (B), the separating mechanism may include a holder holding the plurality of liquid storage portions side by side in a second direction intersecting the first direction, and a moving mechanism configured to move the holder in the first direction; and the liquid supply portion of the liquid container may be coupled to the one end portion of the supply passage indirectly via the holder.

According to this configuration, it is possible to separate a plurality of liquid containers collectively together with the holder from the casing to indirectly separate the plurality of liquid supply portions collectively from one end portion of the supply passage. Therefore, less work is required as compared to when the liquid containers are separated individually.

(E) In the liquid ejecting apparatus according to any one of described above (A) to (D), the liquid discharge portion may be arranged in a bottom surface or a lower portion of a side surface of the liquid storage portion. According to this configuration, it is possible to discharge the residual liquid in the liquid container in the liquid ejecting apparatus to the outside from the liquid discharge portion arranged in a bottom surface or a lower portion of a side surface of the liquid storage portion. Therefore, it is possible to dispose of the liquid ejecting apparatus after discharging the residual liquid in the liquid container to the outside.

(F) In the liquid ejecting apparatus according to any one of described above (A) to (E), the liquid container may include a valve opening and closing a passage of the liquid supply portion, and the valve may open when the liquid supply portion is coupled to the one end portion of the supply passage and may close when the liquid supply portion is separated from the one end portion of the supply passage.

According to this configuration, the valve opens when the liquid supply portion is coupled to one end portion of the supply passage supplying liquid to the ejection head, and the valve closes when the coupling between the liquid supply portion and the one end portion of the supply passage is disconnected. Therefore, it is possible to supply liquid to the ejection head appropriately, and curb leakage of liquid from the liquid supply portion when it is disconnected from the one end portion of the supply passage.

(G) In the liquid ejecting apparatus according to any one of described above (A) to (F), the casing may include a storage portion configured to accommodate the plurality of liquid containers; the storage portion may include a door body having a window portion through which a remaining amount of liquid in the liquid container is viewed; and the door body may be configured to move between a shielding position covering the first direction side of the plurality of liquid containers and an open position not covering the first direction side with respect to the casing.

According to this configuration, it is possible to open the first direction side of the plurality of liquid containers by moving the door body from the shielding position to the open position. Therefore, it is possible to move the plurality of liquid containers in the first direction. As a result, it is possible to pull the liquid container out of the storage portion and separate it directly or indirectly from one end portion of the supply passage.

(H) In the liquid ejecting apparatus according to described above (G), when the door body is in the open position, the liquid container may be pulled out of the storage portion by the separating mechanism to be separated from the one end portion of the supply passage.

According to this configuration, even when the liquid container is accommodated in the storage portion, it is possible to move the liquid container in the first direction and disconnect the coupling between the liquid supply portion and one end portion of the supply passage when the door body is in the open position.

(I) A liquid ejecting system includes: the liquid ejecting apparatus according to any one of described above (A) to (H) and a liquid collection container, in which the liquid collection container includes a collection coupling portion configured to be coupled to the liquid discharge portion of the liquid container, a collection container portion storing liquid collected through coupling between the liquid discharge portion and the collection coupling portion from the liquid container, and an atmospheric connection portion connecting the inside of the collection container portion to the atmosphere; and the liquid discharge portion of at least one liquid container separated from the one end portion of the supply passage among the plurality of liquid containers is coupled to the collection coupling portion, whereby the liquid in the liquid container is collected into the liquid collection container by hydraulic head pressure. According to this configuration, it is possible to collect residual liquid in the liquid container into the collection container relatively easily when disposing of the liquid ejecting apparatus.

What is claimed is:

1. A liquid ejecting apparatus comprising:

an ejection head configured to eject liquid;

a plurality of liquid containers configured to store liquid supplied to the ejection head;

a casing accommodating the ejection head and the plurality of liquid containers; and a fixing portion fixing the plurality of liquid containers to the casing, wherein each of the plurality of liquid containers includes a liquid storage portion configured to store liquid, a liquid supply portion that is a part to which one end portion of a supply passage configured to supply liquid to the ejection head is directly or indirectly coupled, and a liquid discharge portion configured to discharge liquid stored in the liquid storage portion to the outside;

the liquid ejecting apparatus further comprises a separating mechanism configured to, in a state where fixing by the fixing portion of the liquid container to the casing is released, separate the liquid container individually from the casing in a first direction which is a direction of separating the liquid supply portion from the one end portion of the supply passage;

the casing includes a storage portion configured to accommodate the plurality of liquid containers;

the storage portion includes a door body having a window portion through which a remaining amount of liquid in the liquid container is viewed; and the door body is configured to move between a shielding position covering the first direction side of the plurality of liquid containers and an open position not covering the first direction side with respect to the casing.

2. The liquid ejecting apparatus according to claim 1, wherein the separating mechanism includes a holder holding the plurality of liquid storage portions side by side in a second direction intersecting the first direction, and a guide portion guiding the plurality of liquid containers so as to be movable in the first direction with respect to the holder; and the liquid supply portion of the liquid container is coupled to the one end portion of the supply passage indirectly via the holder.

3. A liquid ejecting system comprising:
the liquid ejecting apparatus according to claim 2 and
a liquid collection container, wherein
the liquid collection container includes
a collection coupling portion configured to be coupled to the liquid discharge portion of the liquid container,
a collection container portion storing liquid collected through coupling between the liquid discharge portion and the collection coupling portion from the liquid container, and
an atmospheric connection portion connecting the inside of the collection container portion to the atmosphere; and
the liquid discharge portion of at least one liquid container separated from the one end portion of the supply passage among the plurality of liquid containers is coupled to the collection coupling portion, whereby the liquid in the liquid container is collected into the liquid collection container by hydraulic head pressure.

4. The liquid ejecting apparatus according to claim 1, wherein
the liquid discharge portion is arranged in a bottom surface or a lower portion of a side surface of the liquid storage portion.

5. The liquid ejecting apparatus according to claim 1, wherein
the liquid container includes a valve opening and closing a passage of the liquid supply portion, and
the valve opens when the liquid supply portion is coupled to the one end portion of the supply passage and closes when the liquid supply portion is separated from the one end portion of the supply passage.

6. The liquid ejecting apparatus according to claim 1, wherein
when the door body is in the open position, the liquid container is pulled out of the storage portion by the separating mechanism to be separated from the one end portion of the supply passage.

7. A liquid ejecting system comprising:
the liquid ejecting apparatus according to claim 1 and
a liquid collection container, wherein
the liquid collection container includes
a collection coupling portion configured to be coupled to the liquid discharge portion of the liquid container,
a collection container portion storing liquid collected through coupling between the liquid discharge portion and the collection coupling portion from the liquid container, and
an atmospheric connection portion connecting the inside of the collection container portion to the atmosphere; and
the liquid discharge portion of at least one liquid container separated from the one end portion of the supply passage among the plurality of liquid containers is coupled to the collection coupling portion, whereby the liquid in the liquid container is collected into the liquid collection container by hydraulic head pressure.

8. A liquid ejecting apparatus comprising:
an ejection head configured to eject liquid;
a plurality of liquid containers configured to store liquid supplied to the ejection head;
a casing accommodating the ejection head and the plurality of liquid containers; and
a fixing portion fixing the plurality of liquid containers to the casing, wherein
each of the plurality of liquid containers includes
a liquid storage portion configured to store liquid,
a liquid supply portion that is a part to which one end portion of a supply passage configured to supply liquid to the ejection head is directly or indirectly coupled, and
a liquid discharge portion configured to discharge liquid stored in the liquid storage portion to the outside; and
the liquid ejecting apparatus further comprises a separating mechanism configured to, in a state where fixing by the fixing portion is released, separate the plurality of liquid containers collectively from the casing in a first direction which is a direction of separating the liquid supply portion from the one end portion of the supply passage,
the separating mechanism includes
a holder holding the plurality of liquid storage portions side by side in a second direction intersecting the first direction, and
a moving mechanism configured to move the holder in the first direction; and
the liquid supply portion of the liquid container is coupled to the one end portion of the supply passage indirectly via the holder.

9. A liquid ejecting system comprising:
the liquid ejecting apparatus according to claim 8 and
a liquid collection container, wherein
the liquid collection container includes
a collection coupling portion configured to be coupled to the liquid discharge portion of the liquid container,
a collection container portion storing liquid collected through coupling between the liquid discharge portion and the collection coupling portion from the liquid container, and
an atmospheric connection portion connecting the inside of the collection container portion to the atmosphere; and
the liquid discharge portion of at least one liquid container separated from the one end portion of the supply passage among the plurality of liquid containers is coupled to the collection coupling portion, whereby the liquid in the liquid container is collected into the liquid collection container by hydraulic head pressure.

* * * * *